(12) United States Patent
Vermeulen et al.

(10) Patent No.: US 7,702,640 B1
(45) Date of Patent: Apr. 20, 2010

(54) STRATIFIED UNBALANCED TREES FOR INDEXING OF DATA ITEMS WITHIN A COMPUTER SYSTEM

(75) Inventors: Allan H. Vermeulen, Seattle, WA (US); Ami K. Fischman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 154 days.

(21) Appl. No.: 11/511,075

(22) Filed: Aug. 28, 2006

Related U.S. Application Data

(63) Continuation-in-part of application No. 11/370,353, filed on Mar. 8, 2006.

(60) Provisional application No. 60/754,726, filed on Dec. 29, 2005.

(51) Int. Cl.
*G06F 17/30* (2006.01)

(52) U.S. Cl. .................. 707/100; 707/203; 707/202; 707/204; 707/6

(58) Field of Classification Search ................ 707/100
See application file for complete search history.

(56) References Cited

U.S. PATENT DOCUMENTS

| | | | | |
|---|---|---|---|---|
| 5,202,986 | A * | 4/1993 | Nickel | 707/3 |
| 5,287,500 | A | 2/1994 | Stoppani, Jr. | |
| 5,963,944 | A * | 10/1999 | Adams | 707/10 |
| 6,047,283 | A * | 4/2000 | Braun | 707/3 |
| 6,192,405 | B1 | 2/2001 | Bunnell | |
| 6,226,743 | B1 * | 5/2001 | Naor et al. | 707/E17.012 |
| 6,279,007 | B1 * | 8/2001 | Uppala | 707/101 |
| 6,351,776 | B1 | 2/2002 | O'Brien et al. | |
| 6,463,454 | B1 | 10/2002 | Lumelsky et al. | |
| 6,505,205 | B1 | 1/2003 | Kothuri et al. | |
| 6,557,111 | B1 * | 4/2003 | Theimer et al. | 707/203 |
| 7,146,368 | B2 | 12/2006 | Sonoda et al. | |

(Continued)

FOREIGN PATENT DOCUMENTS

EP 0226734 7/1987

(Continued)

OTHER PUBLICATIONS

Douglas Comer, "The Ubiquitous B-Tree", 1972, ACM Computing Surveys, vol. 11, No. 2, pp. 121-137.*

(Continued)

*Primary Examiner*—Cam Y T Truong
(74) *Attorney, Agent, or Firm*—Robert C. Kowert; Meyertons, Hood, Kivlin, Kowert & Goetzel, P.C.

(57) ABSTRACT

According to one embodiment, a system may include a number of computing nodes configured to implement a number of index data structures each configured to map ones of a plurality of input values to one or more corresponding data items. Each of the index data structures may include a respective plurality of index nodes arranged hierarchically and each having an associated tag value, where each of the data items corresponds to a respective one of the index nodes, and where for a given one of the data items having a given corresponding index node, each tag value associated with each ancestor of the given corresponding index node is a prefix of a corresponding input value mapping to the given data item.

46 Claims, 7 Drawing Sheets

U.S. PATENT DOCUMENTS

| | | | |
|---|---|---|---|
| 7,317,907 | B2* | 1/2008 | Linkert et al. ............ 455/412.1 |
| 7,403,987 | B1 | 7/2008 | Marinelli et al. |
| 2002/0138559 | A1 | 9/2002 | Ulrich et al. |
| 2002/0143755 | A1* | 10/2002 | Wynblatt et al. ............... 707/3 |
| 2002/0147929 | A1 | 10/2002 | Rose |
| 2002/0161781 | A1* | 10/2002 | Leong et al. ............ 707/103 R |
| 2003/0046270 | A1 | 3/2003 | Leung et al. |
| 2003/0088659 | A1 | 5/2003 | Susarla et al. |
| 2003/0204515 | A1* | 10/2003 | Shadmon et al. ............ 707/100 |
| 2004/0193879 | A1 | 9/2004 | Sonoda et al. |
| 2004/0249803 | A1* | 12/2004 | Vankatachary et al. ......... 707/3 |
| 2005/0055322 | A1 | 3/2005 | Masters et al. |
| 2005/0108380 | A1 | 5/2005 | Odhner et al. |
| 2006/0149806 | A1* | 7/2006 | Scott et al. .................. 709/201 |
| 2006/0168154 | A1 | 7/2006 | Zhang et al. |
| 2006/0190556 | A1 | 8/2006 | Lane et al. |
| 2006/0206510 | A1 | 9/2006 | Moulhaud et al. |
| 2007/0027907 | A1 | 2/2007 | Kulkarni et al. |

FOREIGN PATENT DOCUMENTS

| | | |
|---|---|---|
| EP | 1160692 | 12/2001 |
| EP | 1197882 | 4/2002 |
| EP | 1647902 | 4/2006 |
| WO | 0026782 | 5/2000 |

OTHER PUBLICATIONS

Demers, et al., "Epidemic algorithms for replicated database maintenance," Proceedings of the sixth annual ACM Symposium on Principles of distributed computing, 1987, 12 pages.
Bharambe, et al., "Analyzing and Improving BIT Torrent Performance," Microsoft Research Technical Report MSR-TR-2005-03, Feb. 2005, 16 pages.
Van Renesse, et al., "Astrolabe: A robust and scalable technology for distributed system monitoring, management, and data mining," ACM Transactions on Computer Systems, May 2003, 43 pages.
Peterson, et al., "Flexible update propagation for weakly consistent replication," Proceedings of the 16th ACM Symposium on Operating Systems Principles (SOSP-16), 1997, 14 pages.
Van Renesse, et al., "A gossip-style failure detection service," Proceedings of IFIP, 1996, 16 pages.
Rowstron, et al., "Pastry: Scalable, decentralized object location and routing for large-scale peer-to-peer systems," Proceedings of the 18th IFIP/ACM International Conference on Distributed Systems Platforms, 2001, 22 pages.
Van Renesse, "Efficient reliable internet storage," Workshop on Dependable Distributed Data Management, 2004, 6 pages.
Datta, et al., "Range queries in tri-structured overlays," Fifth IEEE International Conference on Peer-to-Peer Computing, 2005, 10 pages.
Gribble, et al., "Scalable, distributed data structures for Internet service construction," Symposium on Operating Systems Design and Implementation, Oct. 2000, 14 pages.
Rodrigues, et al., "When Multi-hop Peer-to-Peer Routing Matters," Proceedings of 3rd International Workshop on Peer-to-Peer Systems, Feb. 2004, 11 pages.
Stocia, et al., "Chord: A Scalable Peer-to-Peer Lookup Service for Internet Applications," ACM SIGCOMM, 2001, 12 pages.
Gray, et al., "The dangers of replication and a solution," ACM SIGMOD, 1996, 10 pages.
Ramabhadran, et al., "Prefix hash tree: an indexing data structure over distributed hash tables," http://www.citeseer.ist.psu.edu/ramabhadran04prefix.html, 2004, 10 pages.
Wood, "Utility Computing Pioneers, Part 2," http://www.enterprisestoragforum.com/manemant/features/article.php/34025. Sep. 1, 2004.
Golding, et al., "Group member in the epidemic style," Technical Report UCSC-CRL-92-13; 1992, May 4, 1992, 12 pages.
Aberer, et al., "Multifaceted Simultaneous Load Balancing in DHT-Based P2P Systems: A New Game with Old Balls and Bins," Self-Star, 2004, 19 pages.
Kephart, et al., "The vision of autonomic computing," IEEE Computer, 2003, 10 pages.
Joseph, et al., "Delay aware dynamic load balancing in i3," http://www.cs.berkeley.edu/~dilip/projects/grad/cs262a-i3loadbalancing.pdf, 2004, 10 pages.
Plaxton, et al., "Accessing Nearby Copies of Replicated Objects in a Distributed Environment," Proceedings of the 9th Annual ACM Symposium on Parallel Algorithms and Architectures, 1997, 23 pages.
Morrison, "PATRICIA-Practical algorithm to retrieve information coded in alphanumeric," Journal of the ACM, v. 15, No. 4, 1968, 21 pages.
Merkle, "A digital signature based on a conventional encryption function," Conference on the Theory and Applications of Cryptographic Techniques on Advances in Cryptology, 1987, 10 pages.
Merkle, "Secrecy, authentication, and public key systems," Stanford University doctoral thesis, 1979, 192 pages.
Bhagwan, et al., "Total Recall: System Support for Automated Availability Management," ACM/USENIX Symposium on Networked Systems Design and Implementation, Mar. 2004, 14 pages.
Bhagwan, et al., "Understanding availability," Proceedings of the 2nd International Workshop on Peer-to-Peer Systems, 2003, 6 pages.
Bhagwan, et al., "Replication Strategies for Highly Available Peer-to-Peer Storage," Future Directions in Distributed Computing, May 2002, 5 pages.
Bhagwan, et al., "Replication Strategies for Highly Available Peer-to-Peer Storage Systems," UCSD Technical Report No. CS2002-0726, Nov. 2002, 14 pages.
IDrive User's Manual, Jul. 2004, 8 pages.
XDrive, "How it works," http://web.archive.org/web/20041231020138/http://www.xdrive.com/howitworks/, 2004, 2 pages.
Tedeschi, "A tidy option for data pack rats," New York Times, Jun. 2, 2005, 3 pages.
Byers, et al., "Informed content delivery across adaptive overlay networks," IEEE/ACM Transactions on Networking, v. 12, No. 5, Oct. 2004, 14 pages.
Byers, et al., "Fast approximate reconciliation of set differences," Boston University Computer Science Technical Report 2002-019, 2002, 16 pages.
Kaplan, et al., "Regular Models of Phonological Rule Systems," Computational Linguistics, 1994, 48 pages.
Kaplan, "Finite State Technology," http://cslu.cse.ogi.edu/HLTsurvey/ch11node8.html, 1996, 3 pages.
Pultz, "Network service providers: The race to new services," Gartner Symposium ITEXPO, 2002, 19 pages.
Gmail Filesystem Overview, http://richard.jone.name/google-hacks/gmail-filesystem/gmail-filesystems.html, 2005, 4 pages.
Gmail Filesystem Old News, http://richard.jones.name/google-hacks/gmail-filesystem/gmail-filesystem-news.html, 2004, 3 pages.
XWEBFAQS overview, http://web.archive.org/web/20041207035142/http://www.xwebservices.com/Web_Services/XWebFAQs/, 2004, 2 pages.
XSpace Version 1.1 overview, http://web.archive.org/web/20041206230129/http://www.xmethods.com/ve2/XSpace.po, 2004, 1 page.
XSpace Doc/Literal Specification, http://web.archive.org/web/20041216105959/www.xmethods.net/xspace/xspace_v1_doclit.html, 2004, 11 pages.
XSPace Version 1 Specification, http://web.archive.org/web/20041216105009/www.xmethods.net/xspace/xspace_v1.html, 2004, 11 pages.
XSpace Example: Accessing XSpace via HTTP, http://web.archive.org/web/20041216105738/www.xmethods.net/xspace/tutorial/TutorialHTTP.html, 2004, 7 pages.
Van Renesse, "Epidemic Protocols (Or, Gossip is Good)," http://www.cs.cornell.edu/rvr/presentations/gossip/ppframe.htm, Oct. 7, 1999, 66 pages.
U.S. Appl. No. 11/371,304, filed Mar. 8, 2006.
U.S. Appl. No. 11/370,353, filed Mar. 8, 2006.
U.S. Appl. No. 11/370,562, filed Mar. 8, 2006.
U.S. Appl. No. 11/371,263, filed Mar. 8, 2006.
Roy Thomas Fielding, "Architectural Styles and the Design of Network-Based Software Architectures," 2000.

Don Box, "A Brief History of SOAP," 2001.

Khare R., et al.: "Extending the Representational State Transfer (REST) Architectural Style for Decentralized Systems," Software Engineering, 2004. ICSE 2004 Proceedings, 26th International Conference in Edinburgh, Scotland, UK, May 23-28, 2004, Piscataway, MJ, USA IEEE, May 23, 2004, pp. 428-437, XP010710991 ISBN: 0-7695-2163-0.

Hoffma, P.E., et al., "URN Resolution Overview," Internet Citation, Oct. 21, 1995, SP002287468 Retrieved from the Internet; URL: http://ftp.ics.uci.edu/pub/ietf/uri/draft-ietf-uri-urn-respdescript-00, retrieved on Jul. 7, 2004 the whole document.

* cited by examiner

STRATIFIED UNBALANCED TREES FOR INDEXING OF DATA ITEMS WITHIN A COMPUTER SYSTEM

PRIORITY DATA

This application is a continuation-in-part of U.S. patent application Ser. No. 11/370,353 filed Mar. 8, 2006, which claims priority to U.S. Provisional Patent Application Ser. No. 60/754,726 filed Dec. 29, 2005, and each of which is herein incorporated by reference in its entirety.

BACKGROUND OF THE INVENTION

1. Field of the Invention

This invention relates to computing systems and, more particularly, to index data structures configured to store records of data relationships within computing systems.

2. Description of the Related Art

Many different types of computing applications require the relationships among different data items to be maintained in a persistent way for reference during data processing. For example, a computer file system may be configured to store and manage information indicating the relationships between individual files (e.g., as identified according to some type of file name) and the specific storage location(s) within virtual or physical storage devices (e.g., logical volumes, hard disk drives, etc.) at which corresponding file data is stored. To access the data of a particular file according to its name, the file system may consult data structures that map the name to various storage locations, and then access the indicated storage locations to retrieve the file data.

Depending on the type of application in which it is employed, a data structure that reflects relationships among data items may cause disruption of application operation or data loss if the data structure becomes damaged or corrupted, for example due to hardware or software faults that arise during application operation. Correspondingly, in some instances, such data structures may be replicated in such a way that reduces the likelihood of unrecoverable data loss. For example, a copy of the data structure may be stored at a different geographic site from a primary instance of the data structure. The site may be selected and configured such that a catastrophe that affects the primary data structure instance is unlikely to affect the copy.

As the number of relationships to be tracked among data items increases, it may be difficult to correspondingly scale the resources of the data structure that stores the relationships in a way that minimally impacts data structure performance. For example, if the size of the data structure exceeds the available physical memory of a computer system seeking to manipulate it, read or write throughput to the data structure may become limited by the rate at which the computer system's virtual memory system can swap portions of the data structure to and from physical memory. Additionally, in cases where the data structure is replicated, it may be necessary to periodically synchronize the replicas, for example to ensure that a standby copy is relatively consistent with a working copy, or to preserve operational consistency when different replicas are actively being used. However, synchronization of data structures may be constrained by the available communication bandwidth between the systems implementing the data structures to be synchronized, as well as the computational overhead of performing the synchronization. For example, a brute-force synchronization approach in which two large data structure instances are compared in their entirety for differences may require a substantial amount of time and/or bandwidth to transmit the contents of one instance to the system implementing the second instance, as well as substantial processing resources to perform item-by-item reconciliation within the instances. Such constraints may effectively reduce the frequency with which synchronization can feasibly be performed or limit the size of the data structures for which synchronization may be supported.

SUMMARY

Various embodiments of stratified unbalanced trees for indexing data items within a computer system are disclosed. According to one embodiment, a system may include a number of computing nodes configured to implement a number of index data structures each configured to map ones of a plurality of input values to one or more corresponding data items. Each of the index data structures may include a respective plurality of index nodes arranged hierarchically and each having an associated tag value, where each of the data items corresponds to a respective one of the index nodes, and where for a given one of the data items having a given corresponding index node, each tag value associated with each ancestor of the given corresponding index node is a prefix of a corresponding input value mapping to the given data item. For each given one of the index data structures, each of the plurality of index nodes included within the given index data structure may be associated with a respective fingerprint value, where for a given one of the index nodes, the respective fingerprint value is indicative of a hash value computed according to a hash algorithm, wherein the hash value is computed as a function of ones of the plurality of index nodes that are hierarchical descendants of the given index node. Additionally, each given one of the index data structures may be stratified among a plurality of index tree data structures, wherein a root node of the given index data structure corresponds to a root node of a first one of the plurality of index tree data structures, where each of a plurality of leaf nodes of the first index tree data structure corresponds to a root node of a respective one of the index tree data structures, and where at least two of the plurality of index tree data structures are stored on different ones of the plurality of computing nodes.

Figure 1:
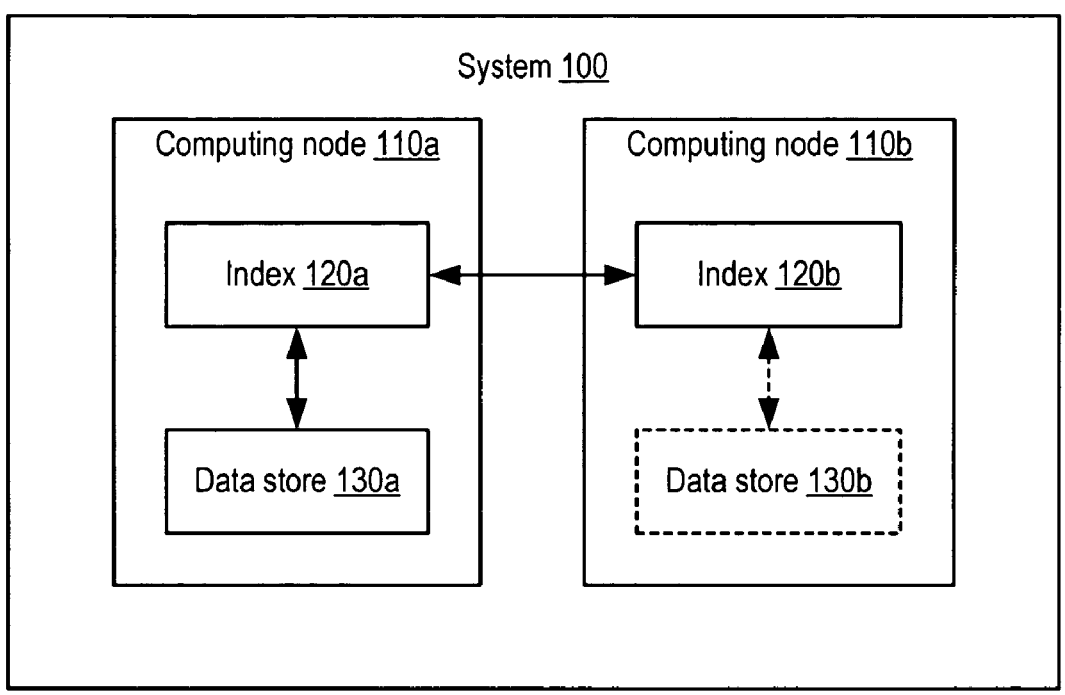
FIG. 1 is a block diagram illustrating one embodiment of a system configured to include replicated instances of an index data structure.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As described above, conventional data structures for organizing relationships among large numbers of data items may present scalability and data reliability challenges. In the following discussion, various embodiments of unbalanced index data structures that may be configured to organize large numbers of data items are described. Subsequently, techniques are discussed for reconciling different instances of unbalanced index data structures, for example in embodiments where such data structures are replicated. Finally, the structure of an exemplary computer system that may be configured to implement these data structures and techniques is described.

Stratified Unbalanced Index Data Structures

One embodiment of a distributed system configured to include several instances of an index data structure that may be managed as replicas of one another is shown in FIG. 1. In the illustrated embodiment, system 100 includes a number of computing nodes 110a-b, each of which is configured to implement a respective instance of an index data structure 120a-b, which may be collectively referred to as index 120. While only two computing nodes 100 are shown, it is contemplated that in various embodiments, any number of instances of index data structure 120 may be implemented by any number of computing nodes 100. It is further contemplated that a single instance of index 120 may span multiple computing nodes 110. For example, as described in greater detail below in conjunction with the description of FIG. 8, computing nodes 110 may correspond to individual computer systems that may be collectively configured to implement an instance of index data structure 120, e.g., in the event that the size of index 120 exceeds the computing resources of a single computing node 110.

Generally speaking, an instance of index 120 may be configured to store indications of the relationships between various input values and data items to which the input values map or correspond. That is, index 120 may be configured to store a collection of mappings between values in a namespace and data items represented by values in the namespace. Specifically, index 120 may include at least one corresponding index node, record, entry or other type of reference for each data item that is indexed, and as described in greater detail below, may include additional information representative of mapping paths from namespace values to particular index entries, such as intermediate nodes, records or other indications, for example. Generally, the collection of data items or data objects organized by index 120 may be referred to as a data store, illustrated in FIG. 1 as data store instance 130a and optional data store instance 130b. Data store instances may be generically referred to as data store 130. As shown, data store 130a is included within computing node 110a, although in other embodiments a data store that is organized or represented by an index 120 may be implemented by one or more computing nodes 110 that are partially or entirely distinct from the computing nodes 110 implementing index 120.

For various reasons, index 120 may be replicated among indexes 120a-b such that changes that occur in one index replica are at least probabilistically likely to be reflected within other index replicas within various performance constraints (e.g., within a bounded period of time). For example, replication of indexes 120 within or across nodes 110 may improve fault tolerance and allow system operation to continue in the event a particular instance of index 120 becomes unavailable. Additionally, replication may allow index workload to be distributed across different computing resources, which may improve index performance. In the illustrated embodiment, computing nodes 110a-b may be configured to implement protocols for reconciling differences that may arise among the replicas of index 120, embodiments of which are described in greater detail below in conjunction with the descriptions of FIGS. 6-7. It is noted that replication of data structures such as index 120 need not be atomic, and replicas need not be guaranteed to be consistent at any given time. That is, it is not necessary that different replicas of a data structure exhibit identical user-visible state at all times, such that modifications to data structure state require atomic or transactional commitment of updates to all or a majority of replicas, although in some embodiments replication may be implemented using such update semantics. It is also noted that in some embodiments, the items of data store 130 that are organized by index 120 may also be replicated using similar or different strategies from those used to replicate and reconcile instances of index 120. However, replication of data store 130 need not be a necessary condition for replication of index 120, and data store 130b may be omitted in some embodiments.

As an example of an application in which system 100 may be deployed, in one embodiment computing nodes 110 may be configured to implement a keymap service for a web-based data storage system configured to store data objects, such as files, on behalf of various system users. For example, a user may supply to the storage system the contents of an object to be stored (e.g., text, image, audio, video or any other type of data or executable code) along with a desired name or key to be associated with the object, such that the object may be later retrieved by specifying the key. The specified key, which in some embodiments may be a text string such as a Uniform Resource Locator (URL), may be one possible value within a namespace of allowable keys.

Within data store 130 of the storage system, the user-provided object contents may be stored in a variety of ways. For example, objects may be replicated across different computing nodes 110 to improve reliability of object data. Additionally, new replicas of objects may be generated if existing ones fails, for example due to failure of a computing node 110 hosting a replica or failure of communication paths by which such a computing node 110 is accessible to the rest of the system. Correspondingly, the relationships between object keys and the actual instances of objects stored within data store 130 may be complex and dynamic, particularly in a system configured to store many objects on behalf of many different clients.

In this example, index 120 may be configured to implement a "keymap" that stores relationships between object keys and index entries representative of the locations of objects within data store 130. For example, in response to receiving a particular key as an input value, index 120 may be configured to identify and retrieve an index record or index entry corresponding to the particular key. The index entry may be a data structure configured to include system-specific data that may be used to identify one or several instances of the object corresponding to the particular key. For example, the entry may include data (e.g., Internet Protocol (IP) addresses, URLs, etc.) that identifies particular computing nodes 110 or devices on which the object is stored, and may or may not include more specific information about how the object is stored within the referenced computing nodes or devices. As objects are created, deleted or migrate within data store 130, index 120 may be configured to update corresponding entries in order to maintain a consistent mapping between keys and their corresponding objects. More details regarding keymap service implementation and operation within an object storage system may be found within U.S. patent application Ser. No. 11/370,353 referenced above, filed Mar. 8, 2006 and entitled "Keymap Service Architecture for a Distributed Storage System."

It is noted that in some embodiments, a given data item to which index 120 maps a particular input value, such as a key, may itself correspond to one or more other data items within data store 130. That is, in some embodiments index 120 may be configured as an indirect index, such that further processing of the data item to which a given input value maps may be required to identify an ultimate data item to which the given input value maps. Referring once again to the keymap example given above, in one embodiment data store 130 may be configured to store multiple functionally equivalent replicas of a given data object corresponding to a given key. Rather than distinguishing and separately indexing each replica of the given data object, index 120 may be configured to index a keymap entry that corresponds to the given key. The keymap entry may include pointers, references or other information distinguishing the replicas of the given data object, though it may not correspond directly to any particular instance of the given data object. In such an embodiment, the collection of keymap entries indexed by index 120, each entry corresponding to a particular key, may correspond to the data items within data store 130 that are directly indexed by index 120. However, a given keymap entry returned by index 120 for an input key value may be further processed (e.g., by a client of system 100) to select a particular instance of a corresponding data object. These instances may correspond to data items within data store 130 that are indirectly indexed by index 120.

In some embodiments, system 100 may scale to support very large numbers of data items within data store 130 to be indexed, e.g., on the order of billions or more. Thus, in such embodiments, each instance of index 120 may have a similarly large number of data items to manage. Further, in many circumstances, the indexing functionality provided by index 120 may be central to the operation of the overall system 100. For example, in one embodiment index 120 may be configured to mediate every request generated by clients of system 100 involving access to a data item within data store 130. In such an embodiment, the performance of system 100 from the perspective of its clients may depend directly on the efficiency and speed with which instances of index 120 access and process their internal state, given an input value. In turn, the performance of index 120 may depend directly on the data structures used to organize its state.

Designing index data structures to support sorting and synchronization operations in a large-scale implementation may present considerable challenges. Conventional applications that require indexing of large amounts of data, such as, e.g., databases, frequently employ conventional balanced data structures, such as B-trees or other types of balanced trees. Generally speaking, when used to index a given quantity of data items, balanced data structure algorithms attempt to distribute data items across the balanced data structure according to the quantity of items being managed. For example, given 10,000 data items to index, a balanced data structure algorithm may attempt to choose breakpoints among the data items such that their corresponding index entries (e.g., index data elements representative of the data items, which may correspond to nodes 210 discussed below or to data structures associated with such nodes) are divided into 10 groups of roughly 1,000 entries per group. The balanced data structure algorithm may create further levels of balanced hierarchy within each group, for example, subdividing each group of roughly 1,000 entries into five subgroups of roughly 200 entries each. As data items are added to and deleted from the balanced data structure, groups and/or subgroups within the data structure may become unbalanced. Thus, conventional balanced data structure algorithms may rebalance the data structure by reallocating entries among groups, creating additional groups, and/or creating additional levels of hierarchy. Such rebalancing may take place "on the fly" as data items are added or deleted, or may occur after a certain number of data item modifications have taken place or a certain amount of time has elapsed since the last rebalancing.

By virtue of segregating entries in a balanced fashion, balanced data structures may present a predictable, roughly uniform access latency for any given data item indexed within the data structure, which may be desirable in a large-scale implementation where a large number of data items need to be indexed. However, it may be particularly difficult to efficiently reconcile or synchronize distributed instances of balanced data structures, for example using a relaxed synchronization model in which discrepancies among instances are allowed to arise and are subsequently resolved using reconciliation techniques. Specifically, as instances of balanced data structures are independently modified, the breakpoints that divide data items into groups within each instance may become divergent. As a result, there may be no direct correspondence in terms of data item membership between groups or subgroups of different balanced data structure instances. To reconcile two such instances, then, it may be necessary to exhaustively compare the entirety of the two instances, which may be extremely time-consuming in cases where each instance indexes a large number of data items.

As an alternative to balanced data structures that distribute data items among groups according to quantity, in some embodiments the data structures employed by index 120 may be configured to implement unbalanced data structures (which may also be referred to as tries) that distribute data items among groups according to some relationship among the data items within each group. Specifically, index 120 may be configured to data items according to prefixes of keys or names corresponding respectively to the data items (e.g., as defined within a suitable namespace for the data items). As an example, consider a case in which there exist 600 data items having corresponding case-insensitive alphanumeric keys. A corresponding balanced index having 600 entries might divide the entries into three balanced groups of 200 entries each. By contrast, in one embodiment an unbalanced index might define three alphanumeric groups such that those entries beginning with the characters a through l are assigned to the first group, those entries beginning with the characters m through x are assigned to the second group, and those entries beginning with the characters y or z or the numerals 0-9 are assigned to the third group.

Entries may be unevenly distributed across the groups of the unbalanced index. For example, there may be 300 entries in the first group, 250 entries in the second group and only 50 entries in the third group. However, it is noted that for any given index entry, membership of the given entry in a particular group of an unbalanced index may be a function of its corresponding key (that is, the namespace value mapping to the given entry's corresponding data item) without dependence on the number of entries in any particular group. Thus, if two instances of an unbalanced index maintain the same group definitions, each group may be independently synchronized without dependence on the other groups. For example, the a-l groups between the two instances may be synchronized independent of the m-x groups and the y-9 groups. By contrast, as described above, synchronization of two instances of a balanced index may require all entries across all groups to be considered.

Figure 2:
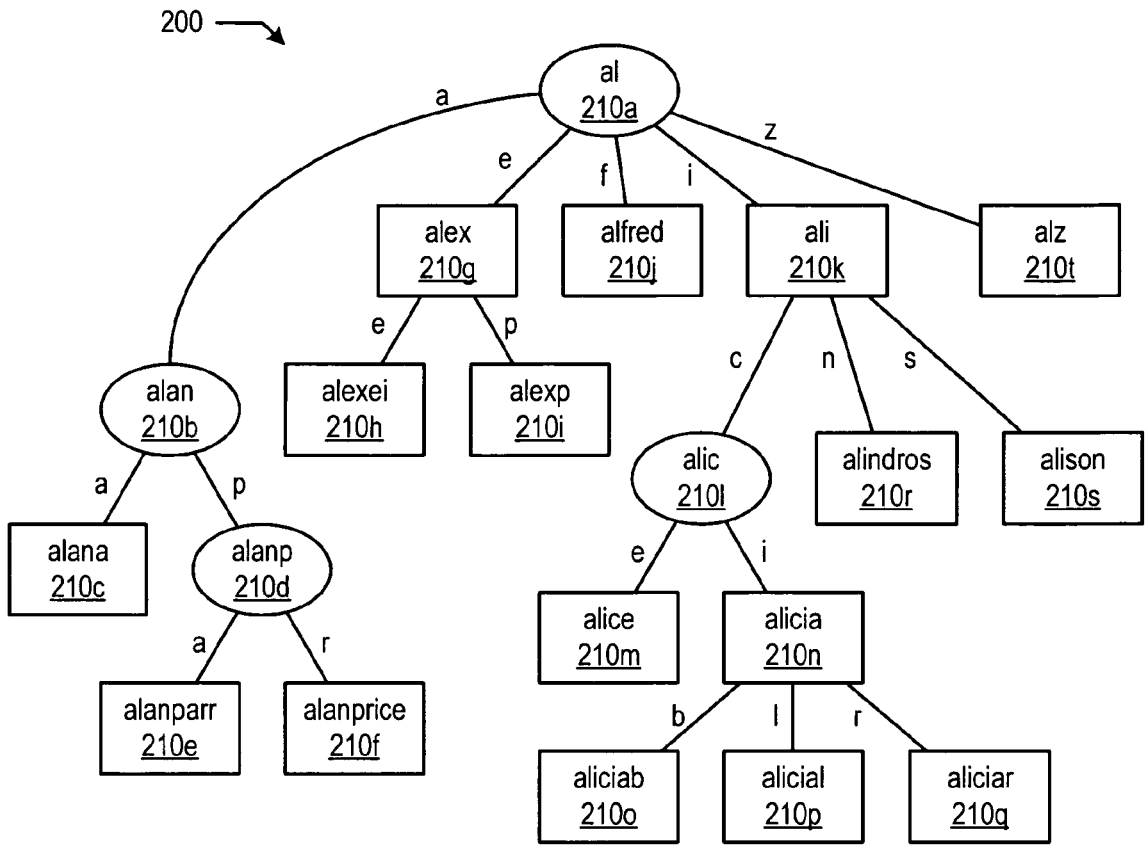
FIG. 2 illustrates one embodiment of an unbalanced index data structure.

One example illustrating the use of an unbalanced data structure to index a number of data items is shown in FIG. 2. In the illustrated embodiment, unbalanced index 200 (or simply, index 200) may be representative of an instance of index 120. As shown, index 200 includes a number of nodes 210 arranged in a hierarchical fashion to index a number of string values beginning with the prefix "al". (It is noted that nodes 210 of the index data structure 200 have no necessary relationship to computing nodes 110 of system 100.) For example, the indexed values may correspond to keys of various data items within data store 130. Each node 210 within index 200 includes an associated tag value that may or may not directly correspond to a data item being indexed. In the illustrated embodiment, nodes depicted as ovals may correspond to interior nodes of index 200 that do not have corresponding data items, while nodes depicted as rectangles may correspond to indexed data items. Thus, for example, node 210a corresponds to the string "al" and is related to a number of other nodes within index 200, but there may not exist an actual key or data item corresponding to the string "al". By contrast, node 210n having the tag "alicia" may correspond to a key of a data item specifying the same string. Generally, a non-interior node of index 200 may be associated with a corresponding data item. In particular, a non-interior node 210 may include or be associated with an entry or record including information about the node's corresponding data item. For example, the record may include data describing properties of the corresponding data item, an indication of where the data item may be located, etc. The distinction between interior and non-interior nodes 210 may or may not be explicitly reflected in the state of a node 210 as stored within an embodiment of index 200.

As described below, in some embodiments an unbalanced data structure may be configured as an index of other indexes. In some such embodiments, a data item indexed within a first instance of index 200 may be a root node 210 of another index 200, and the corresponding node 210 within the first index 200 may be considered a non-interior node. That is, in some embodiments a non-interior node 210 of a given index 200 may be generally defined as any node 210 associated with a data value, such as a record corresponding to a data item or a root node of another index 200, which is external to the given index 200. Similarly, an interior node of a given index 200 may reference only other nodes 210 within the given index 200 and may not bear any association with an indexed data item or with other indexes 200 distinct from the given index 200. It is also noted that, as shown in FIG. 2, non-interior nodes 210 are not necessarily leaf nodes (e.g., nodes that do not reference other nodes at lower hierarchical levels).

Figure 3:
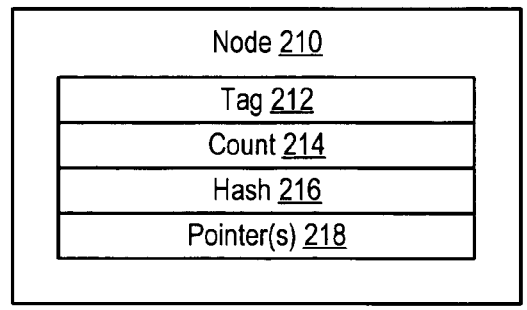
FIG. 3 illustrates one embodiment of an index node for use in an unbalanced data structure.

In various embodiments, each node 210 may encode a variety of information. One embodiment of a generic node 210 illustrating various data fields that may be encoded within the node is shown in FIG. 3. In the illustrated embodiment, node 210 includes a tag field 212, a count field 214, a fingerprint field 216, and one or more pointer fields 218. Generally, tag 212 may be configured to store a value corresponding to a given node 210 that may be used in the course of traversing or manipulating index 200, as described in greater detail below. In some embodiments, tag 212 may uniquely identify a node 210 among all nodes within index 200. Also, in some embodiments, a tag 212 of a given node 210 may include as prefixes the tags 212 of all direct ancestors of the given node 210 within index 200. That is, a tag 212 of any given node 210 may be determined through appending some value to the tag of that given node's immediate parent node 210. For example, consider node 210n of FIG. 2, which has the tag "alicia". Each of node 210n's direct ancestor nodes 210l, 210k and 210a has a tag ("alic", "ali" and "al", respectively) that forms a proper prefix of the tag of node 210n.

As shown in FIG. 2, certain nodes 210 refer to one or more child or descendant nodes 210 farther below in the hierarchy of index 200. In one embodiment, pointer field(s) 218 may be configured to store data reflecting pointers or references from a given node 210 to another node 210. For example, a given pointer field 218 may include an address that identifies a location of the referenced node 210 within an address space, such as a memory address space. The given pointer field 218 may also include additional tag information regarding the referenced node 210. For example, as shown in FIG. 2, each are from a given node 210 to a descendant node 210 is labeled with the first character of the tag 212 of the descendant node 210 that differs from the prefix formed by the tag 212 of the given node 210. In one embodiment, this additional tag information may be stored within a corresponding pointer field 218 along with a pointer to the referenced node 210. For example, the pointer fields 218 included in node 210a may respectively include references to nodes 210b, 210g, 210j, 210k and 210t, as well as corresponding tag data "a", "e", "f", "i" and "z".

As mentioned previously, an index such as index 200 may be used to organize data items for selection, given some input value. In some embodiments, the pointer fields 218 of a non-interior node 210 (that is, a node 210 that maps directly to a data item being indexed) may also include a pointer to a corresponding data item itself or to a record or other data structure corresponding to the data item. For example, a data value in pointer field 218 of a given node 210 may reference a record (e.g., a keymap entry in the keymap example cited above) configured to store information about the locations of multiple data items to which the input value corresponding to given node 210 maps. In some embodiments, as described in greater detail below, unbalanced indexes such as index 200 may be implemented hierarchically, such that a non-interior node 210 of one index 200 may refer to another index 200. A pointer field 218 that references an indexed data item may be distinguished from a pointer field 218 that references another node 210 via any suitable technique, such as by using distinct encodings for the different types of pointer fields 218. For example, in embodiments where tag information associated with arcs to descendant nodes 210 is encoded within pointer fields 218 as described in the previous paragraph, a null tag may be used to distinguish a reference to an indexed data item from references to descendant nodes 210.

For a given node 210, count field 214 and fingerprint field 216 may be configured to reflect the state of nodes 210 beneath the given node 210. In one embodiment, count 214 may be configured to store the count of all nodes that are descendants of (e.g., are hierarchically beneath) the given node 210. For example, node 210k of FIG. 2 has eight other nodes 210 beneath it within index 200. Correspondingly, its count 214 may indicate a value of 8 using any suitable encoding or format.

In various embodiments, fingerprint field 216 of a given node 210 may be configured to store a value indicative of a hash (e.g., the result of a suitable hash algorithm) performed on some portion of the data of the nodes 210 hierarchically beneath the given node 210. For example, fingerprint field 216 of a given node 210 may reflect the sum of the hashes of the tags 212 of all nodes 210 that are descendants of the given node 210. Alternatively, fingerprint field 216 may reflect the hash of the concatenation of tags 212 of descendant nodes 210 according to a particular, consistent order of traversal (e.g., breadth-first or depth-first traversal). In other embodiments, other fields of a node 210 besides tag 212 may participate in hashing. In some embodiments, the data associated with a given node 210 may be reflected within its own fingerprint field 216, whereas in other embodiments a fingerprint field 216 of given node 210 may be determined strictly on the basis of its descendant nodes. For consistency of description, as used herein a fingerprint of a given node 210 may refer to a hash value that is a function of at least some descendant nodes of the given node 210, while a hash of given node 210 may refer to a hash value that is a function of data associated only with given node 210 and not its descendants.

Generally speaking, a hash algorithm may be configured to map a given source data value of possibly arbitrary length onto a smaller, typically fixed-length hash value such that if two hash values differ, the original source data values from which the two hash values were generated must also differ in some way. As hash algorithms are typically not one-to-one functions, identity between two hash values does not necessarily imply identity between original source data values. However, for some classes of hash algorithms, given identical hash values, identity between original source data values used to generate the identical hash values may be statistically likely to within a quantifiable probability or degree of confidence, particularly for source data values that exhibit some degree of redundancy. Different types of hash algorithms may also be referred to as signature, fingerprint or checksum algorithms. It is contemplated that any suitable type of hash algorithm may be employed to generate a hash value to be stored in fingerprint fields 216, including, by way of non-limiting example, any suitable version of the Message Digest 5 (MD5) algorithm or the Secure Hash Algorithm (SHA), such as SHA-1, SHA-256, SHA-512, etc.

In some embodiments, nodes 210 may include respective data fields for, or otherwise be associated with, respective data values in addition to or instead of count or fingerprint values. In one embodiment, such a data value may be determined for a given node 210 as a suitable function of the nodes that are descendants of given node 210. For example, the data value may be defined as the sum, maximum, minimum or any other suitable function of corresponding values of the descendants of given node 210. For example, the data value may be determined as a function of the tag value, fingerprint value, count value or data item corresponding to the descendants of given node 210. The values of the descendants on which the data value determined for given node 210 depends may, but need not, themselves depend on values of further descendants. For example, as described above, the tag value of a given node 210 may not depend on the given node's descendants, while in some embodiments, the count or fingerprint values of a given node 210 may depend on some or all of the given node's descendants.

Where large numbers of data items need to be indexed, as may be common in large-scale instances of system 100, it may be impractical to use a single instance of index 200 for all the data items. For example, a single large index may not completely fit into the memory of a system processing the index, which may negatively affect the performance of operations that depend on the index. In some embodiments, a large index may be implemented using a stratified, unbalanced data structure, which may also be referred to as a stratified index. Generally speaking, in a stratified index, multiple instances of index 200 may be hierarchically defined, where instances higher in the hierarchy may index other indexes 200, and indexes lower in the hierarchy may index particular data items within data store 130.

Figure 4:
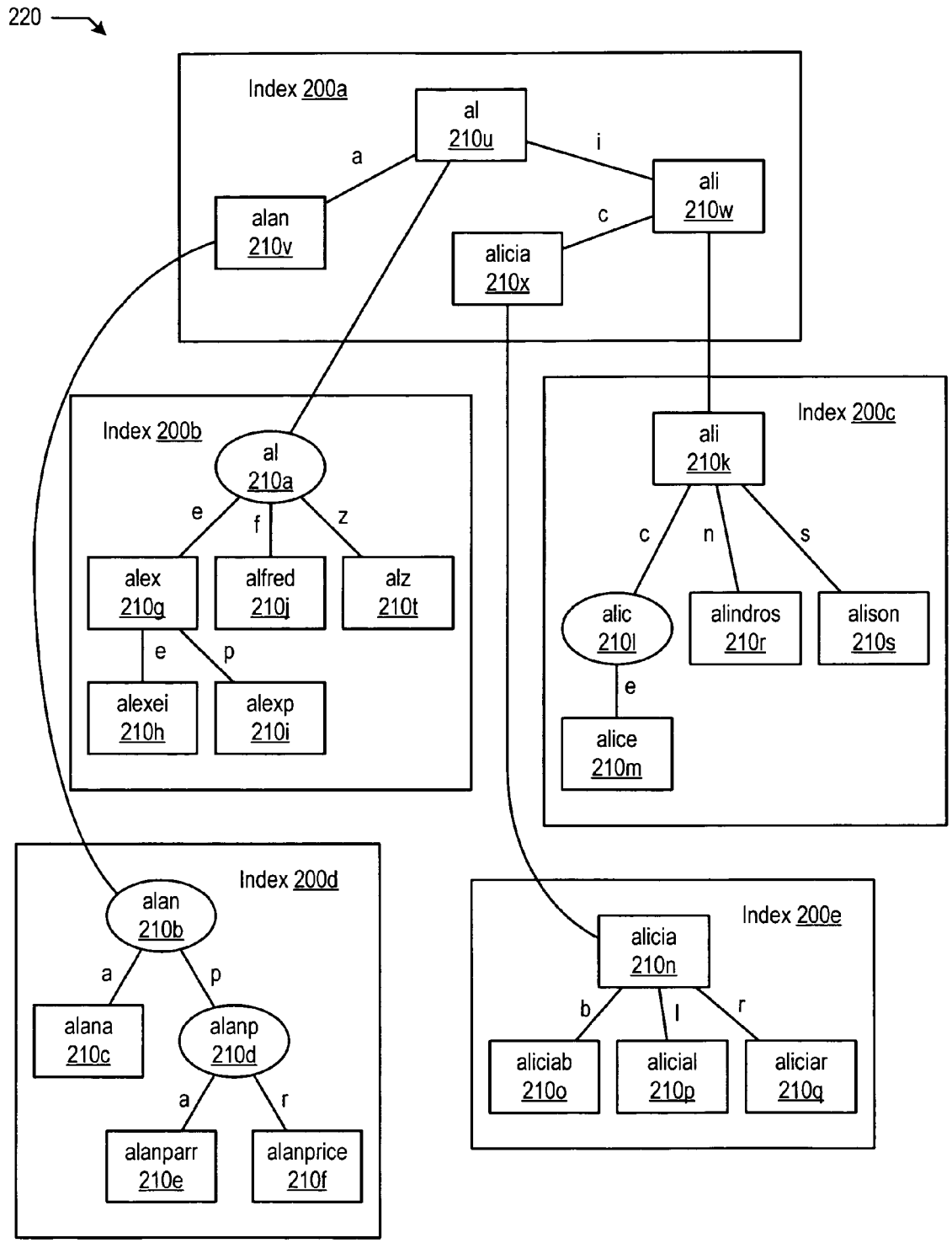
FIG. 4 illustrates one embodiment of a stratified index data structure.

One embodiment of a stratified index is illustrated in FIG. 4. In the illustrated embodiment, stratified index 220 includes five indexes 200a-e. Index 200a includes nodes 210u-x, each of which is a non-interior node that references a respective root node of one of indexes 200b-e. In turn, indexes 200b-e each include various ones of nodes 210a-t that were shown in FIG. 2. In some embodiments of stratified indexes 220, higher-level indexes such as index 200a may be configured to reside in the memory, cache or another higher level of a memory hierarchy of a system processing the index, while lower-level indexes such as indexes 200b-e may primarily reside in disk or another lower level of such a memory hierarchy. In such embodiments, lower-level indexes may be relocated from lower levels to higher levels of the memory hierarchy as needed, for example using paging- or virtual memory-type techniques. By supporting hierarchical partitioning of indexes of large numbers of data items, stratified indexes 220 may more efficiently and effectively use system resources.

For example, using the aforementioned paging techniques, frequently used indexes 200 of stratified index 220 may be kept in higher levels of a memory hierarchy, which are typically faster to access but limited in capacity, while less frequently used indexes 200 may be stored in lower memory hierarchy levels, which are typically slower to access but have greater storage capacity than higher levels. It is contemplated that in some embodiments, as nodes 210 are added to indexes 200 within stratified index 220, individual indexes 200 may grow beyond a target size (such as the size of a disk block or memory page on the system implementing the indexes). In such embodiments, if a given index 200 grows to exceed the target size, it may be split into two or more index instances. In the course of performing such a split, nodes 210 may be added to a higher-level index 200 as necessary to account for the new index instances.

Figure 5:
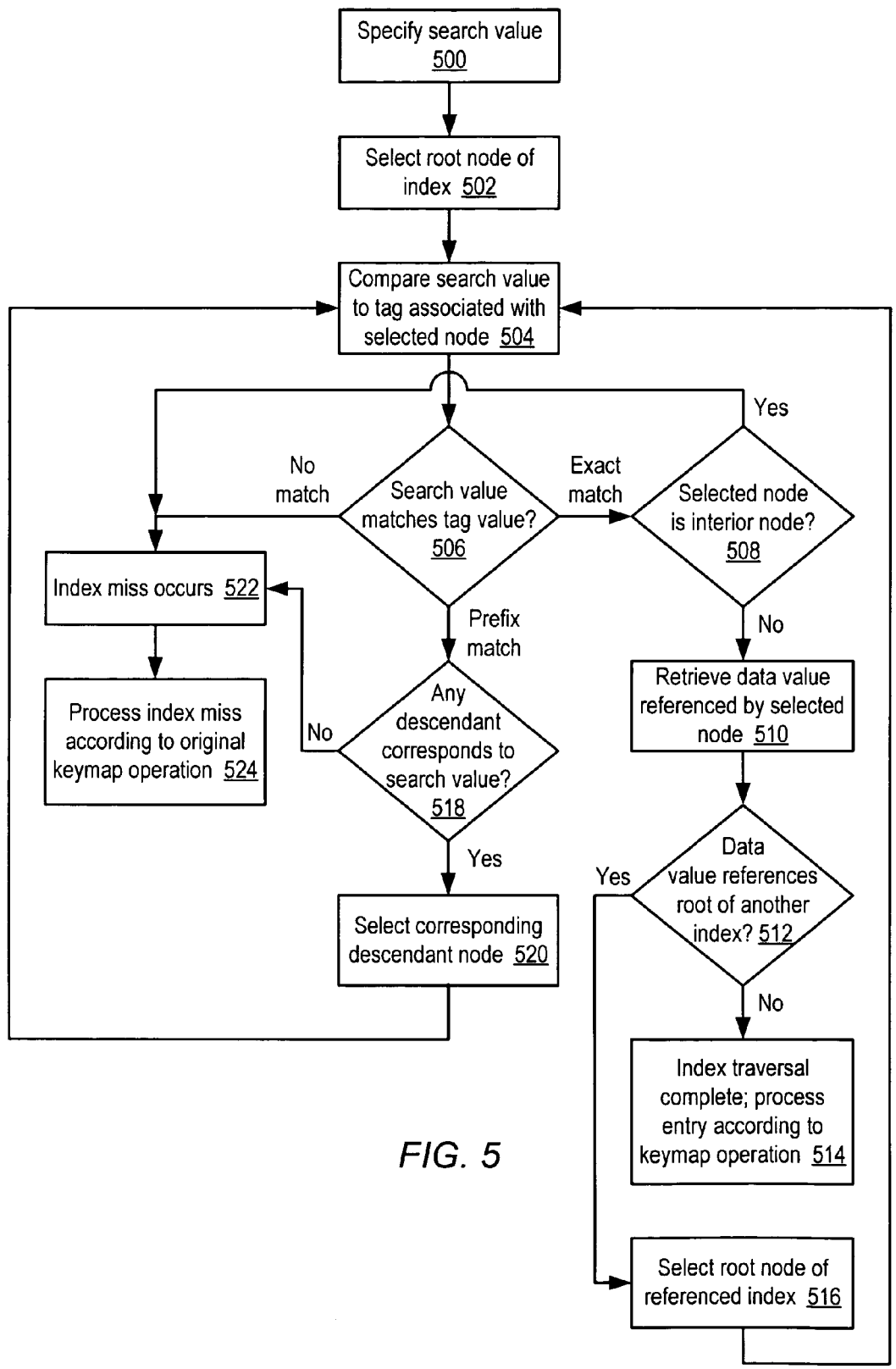
FIG. 5 is a flow diagram illustrating one embodiment of a method of traversing an unbalanced index data structure.

During the course of operation of system 100, system clients may generate requests to access various data items within data store 130, for example by specifying a key or input value corresponding to a given data item in order to read or modify that data item. In response to a request to access an indexed data item according to a specified key, stratified or non-stratified unbalanced indexes may be traversed to determine whether the specified key corresponds to a node 210 within the index 200. One embodiment of a method of unbalanced index traversal is illustrated in FIG. 5. In the illustrated embodiment, operation begins in block 500 where the key value to be searched (also referred to as the search value) within the index is specified, for example via a relevant operational request to system 100. Subsequently, the root node 210 of the index (e.g., the node 210 having no parent node) is selected (block 502).

For the selected node 210, the node's corresponding tag value 212 is compared against the search value to determine whether the tag value matches the search value exactly, is a prefix of the search value, or neither (block 504). If the tag value 212 of the selected node 210 matches the search value, then the selected node 210 is examined to determine whether it is an interior or non-interior node (blocks 506-508). For example, the pointers 218 or other content of the selected node 210 may be examined to determine if the node references a data value indexed by index 200, such as an record of a data item or another instance of an index 200. If the selected node 210 is an interior node, an index miss may occur as described below (block 522).

If the selected node 210 is a non-interior node, the data value referenced by the selected node 210 is retrieved (block 510). In embodiments that support stratified unbalanced data structures, where some data structure instances may index other data structure instances, the retrieved data value may either correspond to an indexed data item of data store 130 or a record thereof, or a root node of another instance of index 200. If the retrieved data value references a data item, index traversal may be complete and the retrieved data item may be processed according to the operation that initiated traversal (blocks 512-514). For example, if the initiating operation was a data item read operation, the retrieved data item may be returned to the initiating client as a result of the read operation. If the initiating operation was a data item write operation, the data item may be modified within data store 130 according to the parameters specified by the client.

If the retrieved data value does not correspond to an indexed data item, then in the illustrated embodiment, it may correspond to a root node 210 of another index 200. Correspondingly, this root node 210 may be selected (blocks 512, 516) and operation may proceed from block 504 where traversal of the newly selected index 200 may proceed. Thus, in one embodiment, execution of the method of FIG. 5 may proceed iteratively until the presence or absence of a node 210 corresponding to the search value is definitively determined.

Returning to block 506, if the tag 212 of the selected node 210 does not match the search value but is a prefix of the search value, then descendants of the selected node 210 may be examined to determine if any descendant corresponds to the search value (block 518). If so, the corresponding descendant node 210 may be selected (block 520), and operation may proceed from block 504. In one embodiment, the pointer(s) 218 of the selected node 210 may be examined to determine whether additional tag information associated with a particular pointer 218, when taken in conjunction with tag 212 of the selected node 210, also forms a prefix of (or entirely matches) the search value. For example, referring to FIG. 5, the tag "al" of node 210a may be determined to be a prefix of a search value of "alibaba". Additionally, the arc from node 210a to node 210k, which may be represented by a corresponding pointer 218, is associated with the additional tag information "i". This tag information, when appended to the tag "al" of node 210a, forms the value "ali", which is also a prefix of the search value. Therefore, node 210k may be selected for further traversal.

Returning to block 518, if no descendant of the selected node 210 corresponds to the search value, the search value does not have a corresponding node 210 within the index 200, which may also be referred to as an index miss (block 522). The index miss may then be processed according to the type of operation that initiated the index traversal (block 524). For example, a data value read operation may process an index miss by returning an appropriate status indication to the client indicating that no data item corresponding to the specified key exists within data store 130. In contrast, a data value write operation may process an index miss by inserting into index 200 a new node 210, corresponding to the data item specified by the client, as a descendant of the selected node 210. For example, the new node 210 may be created and its various fields appropriately set for the data item to be stored, and a pointer 218 to the new node 210 may be stored within the selected node 210. In some embodiments, generation of a new node 210 may include generation of a corresponding record to be reference by the new node 210 and that includes detailed information regarding how to access the specified data item. For example, the specified data item may be stored at some location within data store 130, and this location may be reflected in the record corresponding to the new node 210. It is noted that if a new node 210 is added to an index 200 or an existing node 210 is modified, the count fields 214 and fingerprint fields 216 of all ancestor nodes 210 of the added or modified node 210 may be updated to reflect the change.

Returning to block 506, if the tag 212 of the selected node 210 does not match the search value and is not a prefix of the search value, then an index miss may also occur, and processing may continue from block 522. In some instances, this case may occur when the selected node 210 is the root node of an index 200. Correspondingly, in one embodiment, adding a new node 210 to the index 200 in response to this miss case may include creating a new root node 210 having a tag 212 that is a common prefix of both the search value and the tag 212 of the existing root node 210 (in this case, the selected node 210). (In some instances, the common prefix of the new root node 210 may be null, which may be interpreted as a valid prefix for any value.) The new root node 210 may then be configured to refer to the selected node 210 as a descendant. If necessary, an additional node 210 may be created to correspond to the search value and configured as an additional descendant of the new root node 210.

It is noted that in some embodiments, an index miss may not immediately occur while traversing stratified unbalanced indexes 200 if the tag 212 of the selected node 210 does not match the search value and is not a prefix of the search value. In one embodiment, if this case is encountered, then if selected node 210 has a parent, the parent node 210 is selected. If the parent node 210 is a non-interior node that references another index 200, the root node 210 of the referenced index 200 may be selected and processing may continue from block 504. Otherwise, an index miss may occur. (It is noted, however, that this case may not arise in non-stratified, self-contained indexes 200 that do not index other indexes 200.) As an example of this case, consider the stratified index of FIG. 4 in which the search value is "alice". Traversal of index 200a may proceed to node 210w having tag "ali". Since node 210w has a pointer to descendant node 210x with associated tag information "c", which together with "ali" forms a prefix of the search value, node 210x may be selected. However, the tag of node 210x is "alicia", which does not match and is not a prefix of the search value. Thus, traversal may return to node 210w (the parent of node 210x), which is a non-interior node that references index 200c. Correspondingly, traversal may continue to node 210k and ultimately to node 210m, which has a tag 212 that matches the search value.

Reconciliation of Stratified Unbalanced Trees

As noted above, in some embodiments multiple instances of index 120, each of which may include one or more instances of stratified index 220 or non-stratified index 200, may be implemented within system 100 and configured as replicas of one another. In some embodiments, replica consistency may be enforced by employing replica update semantics that require commitment of updates to all or a majority of indexes of index 120. However, such strong replica synchronization semantics may have deleterious effects on system performance, particularly as system 100 scales to serve larger numbers of clients. For example, requiring updates to be committed to multiple instances before updates are considered complete and become visible to clients may prolong the latency of index update operations. Further, if transactional semantics are employed in which unsuccessful updates must be rolled back to a previous state (e.g., if the minimum number of replicas cannot be successfully updated), the synchronization process may become particularly complex.

While some embodiments of system 100 may use any of the aforementioned synchronization approaches, in an alternative embodiment system 100 may employ a lightweight or relaxed synchronization model. In one embodiment of such a model, individual instances of index 120 may independently operate to service client requests. Upon completing an operation that changes its state (e.g., an operation to add a data item to data store 130, which may require adding a node 210 to an instance of index 200 or 220), index 120 may be configured to forward the operation and its relevant parameters to all or a subset of other instances of index 120. Upon receiving a forwarded update operation, a given instance of index 120 may be configured to perform the operation locally, thus effectively synchronizing the given instance with respect to the received operation.

Generally speaking, it may be expected that forwarding index update operations among instances of index 120 will succeed a majority of the time. Therefore, minimizing the overhead involved in forwarding such operations may decrease the time and/or bandwidth required to achieve synchronization among index instances in a majority of cases. For example, eliminating acknowledgement responses or other types of protocol verification or handshaking from the forwarding process may free communications bandwidth for other uses, such as to support a larger scale of index implementation involving a greater degree of synchronization traffic. In many instances, the time required to propagate index updates throughout system 100 (which may generally correspond to the window of potential inconsistency of the index replicas) may be limited to the communication latency required to forward the operation to the various instances of index 120 and the processing latency required for nodes 110 hosting the instances to apply the forwarded operation. Frequently, this total time may be on the order of seconds or fractions of seconds. (In some embodiments, clients or applications that may be sensitive to this window of potential inconsistency may employ quorum techniques in which a given index read operation is conveyed to multiple instances of index 120, and the read result having majority agreement among the instances is regarded as the result of the read operation.)

In some instances, however, forwarding of index update operations within system 100 may fail. For example, a communication link failure may render one node 110 unreachable from another, or may cause a forwarded operation to be lost, truncated or otherwise damaged in transit. Alternatively, a node 110 may fail to receive or correctly process a properly forwarded update operation, for example due to transient hardware or software issues. If, as in one embodiment, no attempt is made on the part of an originating instance of index 120 to verify or assure that forwarded index update operations are successfully received and processed by targeted instances of index 120 400, forwarding failure of individual operations may result in inconsistency among the index instances with respect to certain nodes 210.

Correspondingly, in one embodiment a relaxed synchronization protocol among instances of index 120 may include an anti-entropy or set reconciliation task. This task may be referred to as an "anti-entropy" task in that generally, operation of the task may serve to reduce differences and increase similarities among different replicas of index 120, thus decreasing the overall entropy among the replicas that may be introduced by random or systemic failure of update propagation to properly synchronize instances. In one embodiment, set reconciliation may be performed when an initiating instance of index 120 randomly selects another index instance with which to perform reconciliation. In various embodiments, such selection may occur at predetermined or dynamically determined intervals. For example, reconciliation may occur at a static rate of once per minute, or at intervals determined according to a random or other statistical probability distribution. In some embodiments, reconciliation may be performed after a certain number of index accesses have occurred, or after access to certain individual ones, types or groups of index nodes has been detected.

Generally speaking, the methods of update propagation and set reconciliation or anti-entropy described above may operate in a complementary fashion. Under the majority of circumstances, update propagation may satisfactorily synchronize different instances of index 120 within system 100. In those instances where index inconsistencies arise due to the failure of update propagation, the anti-entropy task may generally operate to reconcile such inconsistencies. It is noted that in some embodiments, execution of the anti-entropy task may not guarantee that two instances of index 120 are precisely synchronized in their entirety. However, in one embodiment the anti-entropy task may be implemented to guarantee that its operation will not increase the degree of inconsistency between two instances of index 120. Thus, over repeated applications, the anti-entropy task may facilitate convergence of replicas of index 120.

In some embodiments, set reconciliation of different instances of index 120 may be performed using exhaustive protocols that traverse each node of the respective index data structures in a consistent order (e.g., a depth-first or breadth-first search order) to identify discrepancies in index structure or indexed content. However, various features of the unbalanced indexes described above, such as the distribution of data according to key information rather than numbers of keys and the inclusion of count and/or cumulative hash information within the index data structure, may facilitate the implementation of more computationally efficient synchronization algorithms.

Numerous possible versions of the anti-entropy set reconciliation protocol described previously are contemplated for use with unbalanced, possibly stratified indexes implemented within instances of index 120. A description of one embodiment of such a protocol follows, although it is understood that contemplated variations on the general protocol may exhibit different implementation priorities, for example in choosing to optimize certain cases over other cases or to use one or another particular type or class of algorithm to perform a general step of the protocol. Thus, it is intended that the described embodiment be regarded as illustrative rather than limiting.

In one embodiment, an anti-entropy protocol configured to reconcile different instances of an unbalanced index 200 or a stratified unbalanced index 220 may include the exchange between instances of various types of messages between the instances. An exemplary set of messages upon which one embodiment of the anti-entropy protocol may be based may include a DATA message, a REQUEST message, a HASH message, a FILTER message, and a FINGERPRINT message. The general function of respective embodiments of each of these messages is described below, followed by a discussion of how the messages may be used to implement an embodiment of the anti-entropy protocol. In the following discussion, reference may be made to exchange of data among instances of index 120, although it is understood that such instances may implement one or more instances of unbalanced indexes 200 or stratified unbalanced indexes 220 that include any of the features described above.

The DATA message may be used to convey data about one or more index nodes 210 from one index instance 120 to another. In one embodiment, the DATA message may be configured to convey only the tag 212 associated with a given node 210, while in other embodiments the DATA message may convey other fields associated with given node 210. In some embodiments, if a given node 210 is a non-internal node, the DATA message may also include all or some portion of the data item associated with the given node 210 (e.g., a record corresponding to the data item, the data item itself as stored within data store 130, or information about a root node 210 of another index 200).

The HASH message may be used to convey information about one or more index nodes 210 from one index instance 120 to another, without explicitly conveying the fields of a given node 210 or a data item associated with a given node 210. In one embodiment, the HASH message may be configured to convey a tag 212 associated with a given node 210 as well as a hash of the given node 210 computed according to a suitable hash algorithm. In some embodiments, the hash of the given node 210 may also reflect a data item (e.g., as stored within data store 130) associated with the given node 210, but may exclude any descendants of given node 210.

The REQUEST message may be used to convey a request for information associated with one or more nodes 210. In one embodiment, the REQUEST message may be configured to convey one or more tag prefix values. In response, the requesting instance may expect to receive information about those nodes 210 having tags 212 for which the conveyed tag prefix value is in fact a prefix. For a given node 210, the received information may include the contents of the corresponding fields of the given node 210 and/or the data item corresponding to the given node 210. In some embodiments, the REQUEST message may support further qualification of the requested tag prefix values, such as by specifying that a value or range of values within the result space defined by a particular tag prefix value should be excluded from the results returned for that tag prefix value. For example, a REQUEST message may specify that information about all nodes 210 matching the tag prefix value "alex" should be returned, except for those nodes 210 that match the prefixes "alexe" or "alexj".

The messages just described may generally operate at the level of granularity of individual nodes 210. However, if the differences between index instances 120 are generally small (e.g., confined to a minority of nodes 210), it may facilitate the synchronization process to quickly ascertain the status of multiple nodes 210 at once. In one embodiment, the FINGERPRINT and FILTER messages may be configured to communicate information about aggregations of nodes 210. Specifically, in one embodiment the FINGERPRINT message may be configured to convey the fingerprint field 216 of a node 210 along with its tag 212 from one index instance 120 to another. As described above, the fingerprint field 216 of a given node 210 may be configured to store a hash value that is determined as a function of the descendants of the given node 210. Thus, if the fingerprint fields 216 of respective nodes 210 in different index instances are equal, it may be highly probable (depending upon the characteristics of the hash algorithm used) that the arrangement and content of the descendants of the respective nodes 210 are the same. That is, it may be highly probable that the portions of the index instances 120 descending from respective nodes 210 are synchronized.

The use of fingerprints may allow a quick determination as to whether portions of index instances 120 including substantial numbers of nodes 210 are synchronized or not. However, fingerprints indicating that corresponding portions are not synchronized generally may not provide further detail regarding how the portions differ. In one embodiment, a FILTER message may be configured to convey a filter value that encodes a number of nodes 210 corresponding to a particular prefix value from a first index instance 120 to a second index instance 120. The second instance may then use the received filter value to test its own nodes 210 that correspond to the prefix value, to ascertain which nodes 210 of the second instance are not present in the first instance, if any.

In one embodiment, the filter value conveyed by the FILTER message may be a Bloom filter, although it is contemplated that any suitable filtering technique for recoverably encoding a set of data values into a filter value may be employed. Generally speaking, a Bloom filter of a set of values (e.g., nodes 210) may correspond to an M-bit binary value, where M is an integer. Before any values are encoded into a Bloom filter, its initial value may be zero. That is, all bits of the filter may be in a deasserted state. A Bloom filter may be populated by passing each value to be encoded within the filter through each of a set of k independent hash functions, each of which maps the value to be encoded onto a value in the range [0, M−1]. For each of the k resulting hash values, a corresponding bit within the Bloom filter is asserted (e.g., set to a logical 1 value). M and k may be selected as design parameters according to the number and type of values to be encoded within the Bloom filter, as well as the desired probability of false positives (discussed below). For example, in a 1,024-bit Bloom filter using eight hash functions, each hash function may produce a corresponding 10-bit hash value specifying a particular one of the 1,024 bits of the filter to be asserted.

To test whether a given value has been encoded into a Bloom filter, the value is passed through the same set of k independent hash functions used to encode the filter, and the resulting k bits of the filter value are examined. If any of the resulting k bits of the filter are not asserted, the test value is definitely not encoded in the filter. If all of the resulting k bits of the filter are asserted, the test value may or may not be encoded in the filter. That is, the test value may have been originally encoded in the filter, or it may be a false positive. In some embodiments, the hash functions may be parameterized with a salt or seed value that is randomly or spontaneously generated (e.g., as a function of the current system time) on each separate occasion a Bloom filter is generated, to reduce the probability that the same false positive values will be generated when a given set of values is successively encoded into a filter.

Thus, for example, a first index instance 120 may encode a set of nodes {A, B, C, D, E} corresponding to a prefix P into a Bloom filter and may convey the filter to a second index instance 120 using a FILTER message. In the second index instance 120, a set of nodes {A, B, X, Y, Z} may correspond to prefix P. The second index instance 120 may test each of the nodes against the filter and may determine that nodes A, B and X may be encoded in the filter, while nodes Y and Z are definitely not encoded in the filter. Thus, the second index instance 120 may correctly conclude that nodes Y and Z are not present in the first index instance 120, and may conclude that nodes A, B and X are probably present in the first index instance 120, where X is a false positive. As a result, the second index instance 120 may take action to convey information about nodes Y and Z to the first index instance 120.

It is contemplated that the DATA, HASH, REQUEST, FINGERPRINT and FILTER messages may be implemented and conveyed according to any suitable protocol or API, and may include various types of fields or parameters configured to convey the information described above as well as any additional information necessary to decode and properly process the message. In one embodiment, messages may include additional parameters that indicate whether, for a given tag value included in the message, the sending index instance either has corresponding data or needs corresponding data, respectively referred to as the got-data and need-data parameters. For example, if an index instance 120 sends a FINGERPRINT message for a node 210 that has the tag "a1" and some number of descendants, the instance may include a got-data parameter indicating that the instance has some nodes 210 within the prefix space defined by "a1". The instance may also include a need-data parameter, for example if its copy of the prefix space defined by "a1" is believed to be incomplete. In some embodiments, the got-data parameter may be implicit in the DATA and HASH messages, while the need-data parameter may be implicit in the FILTER and REQUEST messages, although a DATA or HASH message may explicitly specify a need-data parameter while a FILTER or REQUEST message may explicitly specify a got-data parameter. In one embodiment, a FILTER message may be required to specify at least one of the need-data or got-data parameters.

In one embodiment, an anti-entropy protocol conducted by two index instances 120 may begin when the two instances establish contact with one another. Each instance may assume that it both has and lacks some data. Correspondingly, each instance may send a FINGERPRINT message to the other instance that specifies the tag 212 and fingerprint 216 of the root node 210 of the instance and includes the got-data and need-data parameters. For example, in an embodiment of index instance 120 employing a stratified unbalanced index 220, the root node 210 may correspond to the node 210 having no parent node within the index 200 that has no parent or superior index 200.

Figure 6:
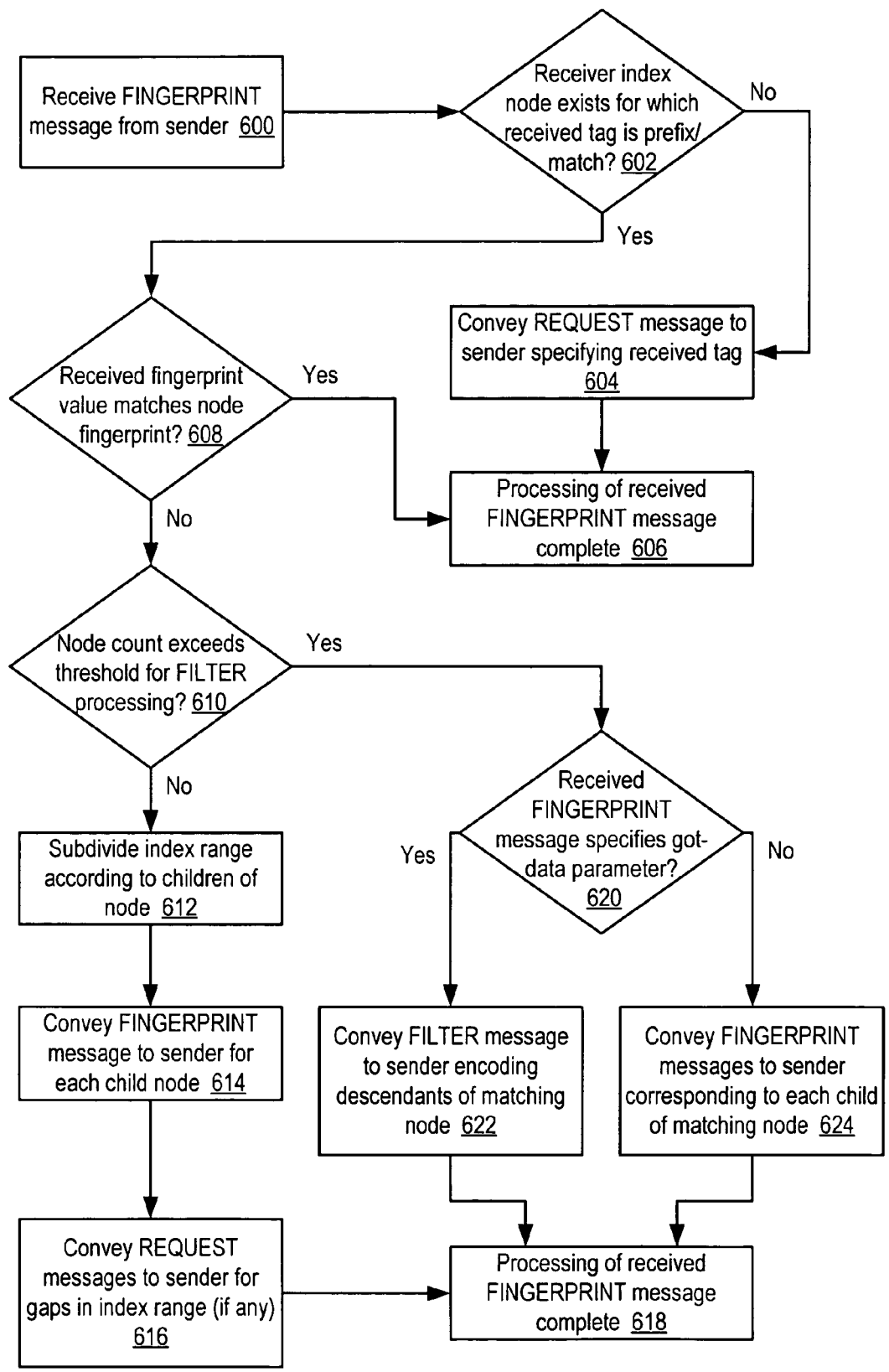
FIG. 6 is a flow diagram illustrating one embodiment of a method of processing a FINGERPRINT anti-entropy protocol message.

One embodiment of a method of processing a FINGERPRINT message is illustrated in FIG. 6. In the illustrated embodiment, operation begins in block 600 where a FINGERPRINT message is received from a message sender. For example, a first index instance 120 may convey a FINGERPRINT message including a tag value, a fingerprint and one or more of the got-data or need-data parameters to a second index instance 120. After a FINGERPRINT message is received, then the index(es) of the message receiver are traversed to identify whether a node 210 exists for which the received tag value is a prefix of (or exactly matches) the corresponding tag field 212 (block 602). For example, the indexes of an index instance 120 may be traversed starting from the root node 210 using the method of FIG. 5 or a suitable variant thereof.

If the received tag value is not a prefix or exact match of a tag field 212 of any node 210, then a node 210 corresponding to the node referenced by the FINGERPRINT message may not exist at the message receiver. Correspondingly, the receiver may respond by conveying a REQUEST message to the message sender specifying the tag value included in the originally received FINGERPRINT message (block 604). In one embodiment, processing of the REQUEST message may proceed as described in greater detail below. In some embodiments, the REQUEST message may be conveyed only if the received FINGERPRINT message indicates the got-data parameter.

It is noted that in some embodiments, completion of individual messages exchanged during operation of the anti-entropy protocol may not depend on whether additional messages generated in response to a given message successfully complete. That is, in some embodiments, the processing of individual messages may occur in a stateless and asynchronous fashion with respect to other messages. In discussion of the exemplary embodiments described herein, this stateless, asynchronous model will be assumed. Thus, after the REQUEST message has been generated, processing of the FINGERPRINT message itself may be considered complete (block 606). However, this model is not essential to the general operation of the anti-entropy protocol, and it is contemplated that in alternative embodiments, any given message may block, wait or otherwise maintain synchronization with messages generated subordinately or in response to the given message. For example, explicit handshaking, acknowledgement, retry or other types of protocols may be employed in some embodiments to convey the state of completion of one message to another dependent message.

If the received tag value does correspond as a prefix or match of a tag 212 of a particular node 210 at the message receiver, the received fingerprint value may be compared against the fingerprint field 216 of the particular node 210 to determine whether the two fingerprints match (block 608). If so, then it may be highly probable (e.g., subject to the probability of the fingerprint algorithm in use producing two fingerprints that collide, or have the same value, despite being generated from different data) that the message sender and the message receiver are synchronized with respect to the received tag value. For example, it may be highly probable that any nodes 210 having the received tag value as a prefix are in the same state within the index instance 120 from which the FINGERPRINT message was sent and the index instance 120 at which the message was received. Thus, no additional messages may be generated in response to the FINGERPRINT message, and the message may be considered complete (block 606).

If the fingerprints do not match, then the message sender and message receiver are not synchronized with respect to the received tag value, and additional work may be needed to bring the sender and receiver closer together in state. As described above, the FILTER message may be useful in allowing a sender to communicate specific information about certain nodes 210 to a receiver. However, in some embodiments, the number of nodes 210 that may be encoded into the FILTER message while preserving a reasonable false-positive rate may be limited to a certain threshold value. If the number of descendant nodes 210 exceeds this threshold at the message receiver node 210 that matches the received tag value, it may be more efficient to perform additional FINGERPRINT message processing before sending FILTER messages.

Thus, in the illustrated embodiment, if the fingerprints do not match, the count field of the particular node 210 at the message receiver may be examined to determine if it exceeds the threshold value for FILTER message processing (block 610). If so, the message receiver may be configured to subdivide its portion of the index range corresponding to the received tag value according to the children of the particular node 210 for which the received tag value is a prefix (block 612). For each child node 210, the message receiver may be configured to send a corresponding FINGERPRINT message back to the original message sender, specifying the tag 212 and fingerprint field 216 of the respective child node 210 (block 614). Additionally, if there are gaps in the portion of the index range corresponding to the received tag value, for example as indicated by the children of the particular node 210, the message receiver may be configured to send one or more REQUEST messages for the tag values that correspond to the gaps (block 616). Processing of the received FINGERPRINT message may then be considered complete (block 618). In one embodiment, in addition to the above actions, if the received tag prefix value is an exact match of the particular node 210, a HASH message corresponding to the particular node 210 may be returned to the message sender.

For example, as shown in FIG. 2, a particular node 210a of an index 200 of a message receiver might have the tag "al" and children having corresponding tags "alan", "alex", "alfred", "ali" and "alz". This suggests that the message receiver has some information about nodes 210 that begin with "alan" and "alex", but not about nodes 210 that might begin with "alb", "alc" or "aid". Correspondingly, the message receiver may convey a FINGERPRINT message for each of the children of node 210a, as well as REQUEST messages for gaps among the tags of these children. In embodiments where negative REQUEST syntax is supported, the message receiver may convey REQUEST messages for tags other than those corresponding to the children of the particular node. For example, the message receiver may send REQUEST messages for tags other than those prefixed with "alan", "alex", "alfred", "ali" and "alz".

If the count value of the particular node 210 does not exceed the threshold value for FILTER message processing, then if the received FINGERPRINT message includes the got-data parameter, the message sender may have specific information about nodes 210 not present at the message receiver. Correspondingly, the message receiver may be configured to send a FILTER message that encodes into a filter (e.g., a Bloom filter as described above) each node 210 that is a descendant of the particular node 210 (blocks 620-622). For example, referring to FIG. 2, if the particular node corresponds to node 210l, then a Bloom filter encoding each of nodes 210m-q may be generated and returned via a FILTER message. In the illustrated embodiment, if the got-data parameter was not included in the original FINGERPRINT message, respective FINGERPRINT messages may be generated and returned to the message sender for each of the children of the particular node 210, instead of the FILTER message (block 624). These FINGERPRINT messages may include the got-data parameter. Following either generation of FILTER or FINGERPRINT messages in this case, processing of the received FINGERPRINT message may be complete (block 618).

Figure 7:
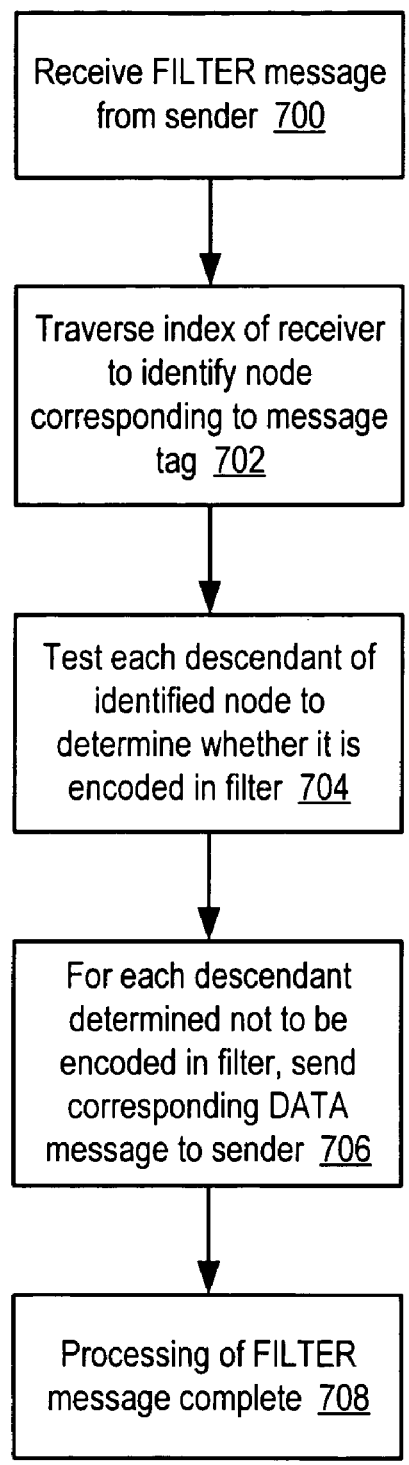
FIG. 7 is a flow diagram illustrating one embodiment of a method of processing a FILTER anti-entropy protocol message.

One embodiment of a method of processing a FILTER message is illustrated in FIG. 7. In the illustrated embodiment, operation begins in block 700 where a FILTER message including a tag value and a filter value is received from a message sender, for example in response to a FINGERPRINT message as described above. Once the FILTER message is received, the index(es) of the message receiver are traversed to identify the particular node 210 that corresponds to the received tag value (e.g., for which the received tag value is a prefix or match), in a manner similar to the described above with respect to FIG. 21 (block 702). In some embodiments, if a FILTER message is generated in response to another message, a node 210 corresponding to the received tag value will generally exist.

The message receiver may then test each descendant of the particular node 210 against the filter value provided in the FILTER message to identify those nodes 210 that are not encoded in the filter value, if any (block 704). For each node 210 at the message receiver that is not encoded in the filter value, a corresponding DATA message may be returned to the message sender (block 706). Processing of the FILTER message may then be considered complete (block 708). As noted above, depending on the type and configuration of the filter algorithm employed for the FILTER message, false positives may occur. That is, the message receiver may falsely conclude that certain ones of its nodes 210 are encoded in the filter value, and thus are present in the same state at the message sender, when in fact they are not. Thus, it is possible that a single round of the anti-entropy protocol may not result in two index instances 140 becoming synchronized with respect to every node 210. However, it may be expected that in many embodiments, a single round of the anti-entropy protocol may not cause the instances to become more divergent, and repeated applications of the protocol may be expected to converge within a certain number of rounds with a certain degree of probability, depending on the degree to which the instances differ and the characteristics of the filter algorithm used (e.g., the probability of false positives given the threshold value for filter encoding).

In some embodiments, processing of the HASH, REQUEST and DATA messages may be considerably simpler than the FILTER and FINGERPRINT messages. In one embodiment, a HASH message receiver may attempt to identify a node 210 corresponding to the tag value included in the message, and may then compute a corresponding hash value of the identified node 210. If the received hash value matches the computed hash value, the identified node 210 may already be synchronized with a corresponding node 210 at the message sender. Otherwise, a REQUEST message including the received tag value is returned to the message sender to obtain a more current data version.

Processing of a REQUEST message, in one embodiment, may simply include the message receiver identifying each node 210 for which the received tag value included in the message matches or is a prefix of the corresponding tag field 212, for example using the unbalanced index navigation techniques described above. For each identified node 210, a corresponding DATA message, configured as described above, is returned to the message sender. In one embodiment, processing of a received DATA message may include identifying whether a node 210 corresponding to the tag value indicated in the message exists at the message receiver. If not, a corresponding node 210 may be created and populated with data extracted from the message. If so, the data associated with the existing node 210 and/or its corresponding data value may be replaced with data extracted from the message. In some embodiments, data of an existing node 210 may only be replaced if the received data is more current. For example, a DATA message may include the contents of a record corresponding to a node 210 at the message sender, and the record may include timestamp information that may be compared with corresponding timestamp information at the message receiver to ascertain whether the received record is more current than the existing record. If so, the received record may replace the existing record.

Variations of the general synchronization protocol of FIG. 6 are possible and contemplated. For example, in embodiments in which communication between index instances is performed using packets having a fixed length, bandwidth utilization may be improved by conveying multiple FINGERPRINT messages for multiple nodes 210 within a single packet, rather than a single FINGERPRINT message corresponding to a particular node 210. An instance receiving such a packet may then be able to rapidly discern which particular ones of its index(es) 200 mismatch with the sender without necessarily exchanging further messages with the sender. For example, if the first FINGERPRINT message does not match, the receiver may consider other FINGERPRINT messages within the packet prior to issuing a REQUEST, FILTER or other message to the packet sender. In so doing, the receiver may be able to narrow the discrepancy to a particular portion of the data structure, which may reduce unnecessary network traffic to exchange messages regarding other portions of the data structure that are already synchronized.

In general, it is contemplated that any of the methods or techniques described above for performing index instance reconciliation using an anti-entropy protocol and/or an update propagation protocol may be implemented by a process executable by one or more of nodes 110 to implement the functionality of an instance of index 120. It is noted that numerous variations of the aforementioned methods and techniques for implementing anti-entropy protocols for unbalanced data structures are possible and contemplated, and the above discussion is intended to be illustrative rather than limiting. For example, the general class of protocols via which some entities frequently communicate with other, randomly selected entities in order to distribute information throughout a network may be referred to as gossip-based protocols, and other techniques or aspects of gossip-based protocols may be employed for use in an anti-entropy protocol among index instances 120. In various embodiments, the example synchronization messages described above (or other suitable messages) may be combined in different ways to yield synchronization protocols having different characteristics.

Additionally, while the keymap index application discussed above has been described as one possible application in which the stratified indexed data structure and synchronization techniques described above with respect to FIGS. 1-7 may be employed, it is contemplated that such data structures and synchronization techniques may be employed in any application in which large quantities of data may be indexed for rapid access. Such applications need not necessarily include object storage systems, but may include key-value database systems, search systems, or any other applications where data indexing may be applicable.

Generally speaking, the methods and techniques described above may be applicable to any system in which each member of a collection of data items is associated with a respective key or name defined within a namespace, where the data item names are capable of being organized in some suitable hierarchical, prefix-based fashion such as described above. For example, the data items may correspond to files within a file system having corresponding names within the file system namespace. Alternatively, the data items may correspond to web pages or other web-based resources having corresponding URLs within a URL namespace (which may be defined relative to the public Internet, a private intranet, or a combination of these).

It is also contemplated that the indexing techniques described herein may be applied within data objects having some degree of internal structure, in addition to or instead of among collections of such data objects. For example, a given complex document such as a book may be regarded as a single object. As such, at one level of abstraction, the given document may be treated as a single data item and indexed along with other data items, such as other documents or files within a storage system or another type of namespace. However, the given document may have substantial internal structure that may be defined according to a namespace corresponding to the document, such as sections, chapters, pages, etc. Correspondingly, it is possible that in some embodiments, the structural elements within a given document's namespace may correspond to data items within data store 130, and may be indexed according to the techniques described above. In other embodiments, it is contemplated that hybrid indexing techniques may be employed in which different data items may be indexed according to different levels of granularity. For example, the given complex document may be regarded as a data item unto itself among other documents, some of which may have no additional internal structure to be indexed. For those documents that do possess such additional internal structure, elements of that structure may be treated as additional data items to be indexed. Thus, in various embodiments, applications of the indexing techniques described herein may range among different levels of abstraction or granularity, and may support combinations of different levels of abstraction or granularity.

In some embodiments, the methods for accessing nodes of and synchronizing instances of index 120 may be implemented along with the data contents of an instance of index 120 as part of a single computational construct, for example as methods associated with an object in an object-oriented programming paradigm. In other embodiments, portions of index 120 configured to store data may be implemented as distinct, separate structures from portions of index 120 configured to access data and perform other control-related tasks such as set reconciliation, client interfacing, etc. It is intended that references to an index data structure such as index 120 encompass both the passive structures in which data may be stored as well as the active functionality that may be configured to operate on the stored data to implement desired index data structure operations, such as index read and write accesses, index reconciliation, or other operations.

It is noted that in various embodiments, implementation of any type of random generation or selection of events described herein may employ any suitable algorithm or technique for random number or event generation. In many cases, computational techniques for implementing random methods may not produce purely random results, but rather pseudorandom results. For example, pseudorandom algorithms may specify deterministic processes configured to generate statistically random results. As used herein, the generation of "random" or "substantially random" data is intended to include any suitable pseudorandom computational techniques as well as purely random data sources.

Exemplary Computer System Embodiment

It is contemplated that in some embodiments, any of the methods or techniques described above may be implemented as program instructions and data capable of being stored or conveyed via a tangible, computer-accessible storage medium. Such methods or techniques may include, for example and without limitation, the functions of instances of index 120, data store 130, and indexes 200 and 220. Such methods or techniques may further include any of the methods illustrated in FIGS. 5-7 and any suitable variations thereof. Such program instructions may be executed to perform a particular computational function, such as a particular method or portion of a method described above, as well as to provide more general operating system functionality, application functionality, and/or any other suitable functions. It is noted that in some embodiments, components or methods described above as distinct may in other embodiments be integrated into fewer entities than those shown, or functionality may be partitioned differently across components or methods from the partitioning described above.

Figure 8:
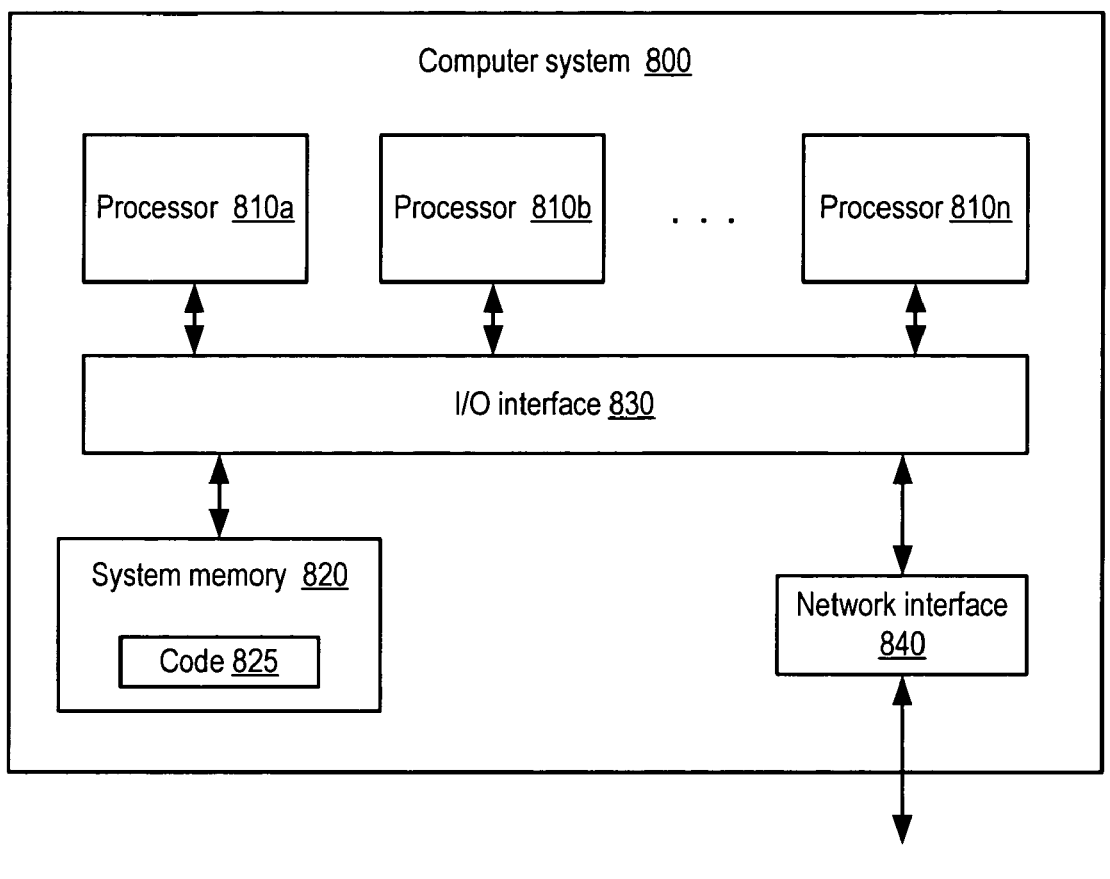
FIG. 8 is a block diagram illustrating an exemplary embodiment of a computer system.

One exemplary embodiment of a computer system including computer-accessible storage media is illustrated in FIG. 8. Computer system 800 may represent one embodiment of computing node 110. As discussed previously, in one embodiment the functionality of any of the various storage system components described above may be distributed across a number of computing nodes 110, such that a given component may be implemented by one or more computing nodes or partitioned across several computing nodes. While in some embodiments, a computing node 110 may exclusively implement the functions of a single component of system 100, such as an instance of index 120 or data store 130, in other embodiments a computing node 110 may implement the functionality of all or portions of several different components of system 100. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be a general-purpose or embedded processor implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by process 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as any of those storage service system components and other functions described in detail above, are shown stored within system memory 820 as code 825. It is noted that in some embodiments, code 825 may include instructions and data implementing desired functions that are not directly executable by processor 810 but are represented or encoded in an abstract form that is translatable to instructions that are directly executable by processor 810. For example, code 825 may include instructions specified in an ISA that may be emulated by processor 810, or by other code 825 executable on processor 810. Alternatively, code 825 may include instructions, procedures or statements implemented in an abstract programming language that may be compiled or interpreted in the course of execution. As non-limiting examples, code 825 may include code specified in a procedural or object-oriented programming language such as C or C++, a scripting language such as perl, a markup language such as HTML or XML, or any other suitable language.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network, such as other computer systems, for example. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 820 may be one embodiment of a tangible, computer-accessible storage medium configured to store program instructions and data as described above. However, in other embodiments, program instructions and/or data may be received, sent or stored upon different types of computer-accessible storage media. Generally speaking, a computer-accessible storage medium may include storage or memory media such as magnetic or optical media, e.g., disk or CD/DVD-ROM coupled to computer system 800 via I/O interface 830. A computer-accessible medium may also include any volatile or non-volatile media such as RAM (e.g. SDRAM, DDR SDRAM, RDRAM, SRAM, etc.), ROM, etc, that may be included in some embodiments of computer system 800 as system memory 820 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 840.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a plurality of computing nodes configured to implement a plurality of replicated index data structures each replicated index data structure configured to map ones of a plurality of input values to one or more corresponding data items, each of said computing nodes comprising at least one computer system having at least a processor, and wherein the computing nodes are configured to communicate with one another via a network;
wherein each of said plurality of index data structures includes a respective plurality of index nodes arranged hierarchically and each index data structure having an associated tag value, wherein each of said data items corresponds to a respective one of said index nodes, and wherein for each given one of the index nodes for which there exists a corresponding given one of said data items, each tag value associated with each ancestor of said given index node is a prefix of input value that maps to said given data item;
wherein each given one of said index data structures is configured as an unbalanced data structure and is further configured such that for each particular index node within said given index data structure, membership of the particular index node within a particular hierarchical subgroup of said given index data structure is dependent upon the tag value associated with the particular index node and is independent of a number of index nodes within the particular hierarchical subgroup;

wherein for each given one of said index data structures, each of said plurality of index nodes included within said given index data structure is associated with a respective fingerprint value, wherein for a given one of said index nodes, said respective fingerprint value is indicative of a hash value computed according to a hash algorithm, wherein said hash value is computed as a function of ones of said plurality of index nodes that are hierarchical descendants of said given index node;

wherein each given one of said index data structures is stratified among a plurality of index tree data structures, wherein a root node of said given index data structure corresponds to a root node of a first one of said plurality of index tree data structures, wherein each of a plurality of leaf nodes of said first index tree data structure corresponds to a root node of a respective one of said index tree data structures, and wherein at least two of said plurality of index tree data structures are stored on different ones of said plurality of computing nodes;

wherein in response to receiving a request to access a given input value, a given one of said plurality of index data structures is configured to select a given one of said index nodes of said given index data structure and to compare a tag value associated with said given index node with said given input value to determine whether said tag value is a prefix of said given input value; and wherein in response to determining that said tag value is a prefix of said given input value, said given index data structure is further configured to determine whether a corresponding tag value of any descendant of said given index node exactly matches or is a prefix of said given input value, wherein in response to determining that a corresponding tag value of a given descendant of said given index node exactly matches or is a proper prefix of said given input value, said given index data structure is further configured to select said given descendant for further traversal.

2. The system as recited in claim 1, wherein at least two of said plurality of index data structures are stored on different ones of said plurality of computing nodes.

3. The system as recited in claim 1, wherein for a given one of said index data structures, each of said plurality of index nodes included within said given index data structure is associated with a respective count value, wherein for a given one of said index nodes, said respective count value is indicative of a number of ones of said plurality of index nodes that are hierarchical descendants of said given index node.

4. The system as recited in claim 1, wherein for a given one of said index data structures, each of said plurality of index nodes included within said given index data structure is associated with a respective data value, wherein for a given one of said index nodes, said respective data value is computed as a function of ones of said plurality of index nodes that are hierarchical descendants of said given index node.

5. The system as recited in claim 1, wherein for a given one of said index nodes having a first and a second child node, a number of descendants of said first child node does not equal a number of descendants of said second child node.

6. The system as recited in claim 1, wherein in response to receiving a request to access said given input value, said given one of said plurality of index data structures is further configured to determine whether said tag value exactly matches said given input value.

7. The system as recited in claim 6, wherein in response to determining that said tag value exactly matches said given input value, said given index data structure is further configured to determine whether said given index node is an interior or a non-interior node, and in response to determining that said given index node is an interior node, said given index data structure is further configured to return a response to said request indicating that no data item corresponding to said given input value exists within said given index data structure.

8. The system as recited in claim 7, wherein in response to determining that said given index node is a non-interior node, said given index data structure is further configured to determine whether said given index node corresponds to a root node of a given one of said index tree data structures, and in response to determining that said given index node corresponds to a root node of a given one of said index tree data structures, said given index data structure is further configured to traverse said given index tree data structure beginning from said root node.

9. The system as recited in claim 8, wherein in response to determining that said given index node does not correspond to a root node of a given one of said index tree data structures, said given index data structure is further configured to return an indication of a particular one of said data items associated with said given index node as a response to said request.

10. The system as recited in claim 6, wherein in response to determining that said tag value of said given index node neither exactly matches nor is a prefix of said given input value, said given index data structure is further configured to return a response to said request indicating that no data item corresponding to said given input value exists within said given index data structure.

11. The system as recited in claim 1, wherein in response to determining that no corresponding tag value of any descendant of said given index node exactly matches or is a proper prefix of said given input value, said given index data structure is further configured to return a response to said request indicating that no data item corresponding to said given input value exists within said given index data structure.

12. The system as recited in claim 1, wherein a given one of said plurality of index data structures is configured to select a random one of said plurality of index data structures at regular or irregular intervals and to at least partially synchronize said respective index nodes of said given index data structure and said randomly-selected index data structure according to an anti-entropy synchronization protocol.

13. The system as recited in claim 12, wherein to perform said anti-entropy synchronization protocol with respect to a given index node of said given index data structure, said given index data structure is configured to send a fingerprint message to said randomly-selected index data structure including said associated tag value and said respective fingerprint value corresponding to said given index node of said given index data structure.

14. The system as recited in claim 13, wherein in response to receiving said fingerprint message, said randomly-selected index data structure is configured to determine whether said tag value included in said fingerprint message matches any particular index node included in said randomly-selected index data structure, and wherein in response to determining that said tag value does not match any particular index node, said randomly-selected index data structure is configured to send a message to said given index data structure requesting data associated with said tag value.

15. The system as recited in claim 14, wherein in response to determining that said tag value does match a particular index node, said randomly-selected index data structure is further configured to determine whether said respective fingerprint value associated with said particular index node matches said respective fingerprint value corresponding to said given index node of said given index data structure.

16. The system as recited in claim 15, wherein in response to determining that respective fingerprint values associated with said particular index node and said given index node do not match, said randomly-selected index data structure is further configured to send to said given index data structure a respective fingerprint message for each child node of said particular index node, wherein for each given child node of said particular index node, said respective fingerprint message includes said associated tag value and said respective fingerprint value corresponding to said given child node.

17. The system as recited in claim 15, wherein in response to determining that respective fingerprint values associated with said particular index node and said given index node do not match, said randomly-selected index data structure is further configured to encode each descendant of said particular index node into a Bloom filter and send to said given index data structure a filter message including said Bloom filter.

18. A method, comprising:
one or more computer systems implementing:
for each of a plurality of input values that maps to a corresponding one of a plurality of data items, storing a respective one of a plurality of index nodes within an index data structure, wherein each of said data items corresponds to a respective one of said index nodes, and wherein the index data structure is configured as an unbalanced data structure and is further configured such that for each particular index node within said index data structure, membership of the particular index node within a particular hierarchical subgroup of given index data structure is dependent upon tag value associated with the particular index node and is independent of a number of index nodes within the particular hierarchical subgroup;
storing a respective tag value for each of said index nodes such that for each given one of the index nodes for which there exists a corresponding given one of said data items, each tag value associated with each ancestor of said given index node is a prefix of the input value that maps to said given data item;
storing a respective fingerprint value for each of said index nodes, wherein for a given one of said index nodes, said respective fingerprint value is indicative of a hash value computed according to a hash algorithm, wherein said hash value is computed as a function of ones of said plurality of index nodes that are hierarchical descendants of said given index node;
storing said index data structure among a plurality of index tree data structures, wherein a root node of said index data structure corresponds to a root node of a first one of said plurality of index tree data structures, wherein each of a plurality of leaf nodes of said first index tree data structure corresponds to a root node of a respective one of said index tree data structures, and wherein at least two of said plurality of index tree data structures are stored on different ones of a plurality of computing nodes, each of said computing nodes comprising at least one computer system having at least a processor, and wherein the computing nodes are configured to communicate with one another via a network;
in response to receiving a request to access a given input value, selecting a given one of said index nodes of said index data structure and comparing a tag value associated with said given index node with said given input value to determine whether said tag value is a prefix of said given input value;
in response to determining that said tag value is a prefix of said given input value, determining whether a corresponding tag value of any descendant of said given index node exactly matches or is a prefix of said given input value; and
in response to determining that a corresponding tag value of a given descendant of said given index node exactly matches or is a proper prefix of said given input value, selecting said given descendant for further traversal.

19. The method as recited in claim 18, further comprising replicating said index data structure among said plurality of computing nodes.

20. The method as recited in claim 18, further comprising:
in response to receiving said request to access a given input value, determining whether said tag value exactly matches said given input value.

21. The method as recited in claim 20, further comprising:
in response to determining that said tag value exactly matches said given input value, determining whether said given index node is an interior or a non-interior node; and
in response to determining that said given index node is an interior node, returning a response to said request indicating that no data item corresponding to said given input value exists within said index data structure.

22. The method as recited in claim 21, further comprising:
in response to determining that said given index node is a non-interior node, determining whether said given index node corresponds to a root node of a given one of said index tree data structures; and
in response to determining that said given index node corresponds to a root node of a given one of said index tree data structures, traversing said given index tree data structure beginning from said root node.

23. The method as recited in claim 22, further comprising:
in response to determining that said given index node does not correspond to a root node of a given one of said index tree data structures, returning an indication of a particular one of said data items associated with said given index node as a response to said request.

24. The method as recited in claim 20, further comprising:
in response to determining that said tag value of said given index node neither exactly matches nor is a prefix of said given input value, returning a response to said request indicating that no data item corresponding to said given input value exists within said index data structure.

25. The method as recited in claim 18, further comprising:
in response to determining that no corresponding tag value of any descendant of said given index node exactly matches or is a proper prefix of said given input value, returning a response to said request indicating that no data item corresponding to said given input value exists within said index data structure.

26. The system as recited in claim 1, wherein for any two or more of the index data structures that each include a respective index node having a same associated tag value, said two or more index data structures are configured such that all descendants of said respective index node are capable of being synchronized across each of the two or more index data structures without any dependence upon index nodes of the two or more index data structures that are not descendants of said respective index node.

27. A tangible, computer-accessible storage medium comprising instructions, wherein the instructions are executable to:
for each of a plurality of input values that maps to a corresponding one of a plurality of data items, store a respective one of a plurality of index nodes within an index data structure, wherein each of said data items corresponds to a respective one of said index nodes, and wherein the index data structure is configured as an unbalanced data structure and is further configured such that for each particular index node within said index data structure, membership of the particular index node within a particular hierarchical subgroup of said given index data structure is dependent upon the tag value associated with the particular index node and is independent of a number of index nodes within the particular hierarchical subgroup;

store a respective tag value for each of said index nodes such that for each given one of the index nodes for which there exists a corresponding given one of said data items, each tag value associated with each ancestor of said given corresponding index node is a prefix of the input value that maps to said given data item;

store a respective fingerprint value for each of said index nodes, wherein for a given one of said index nodes, said respective fingerprint value is indicative of a hash value computed according to a hash algorithm, wherein said hash value is computed as a function of ones of said plurality of index nodes that are hierarchical descendants of said given index node;

store said index data structure among a plurality of index tree data structures, wherein a root node of said index data structure corresponds to a root node of a first one of said plurality of index tree data structures, wherein each of a plurality of leaf nodes of said first index tree data structure corresponds to a root node of a respective one of said index tree data structures, and wherein at least two of said plurality of index tree data structures are stored on different ones of a plurality of computing nodes, each of said computing nodes comprising at least one computer system having at least a processor, and wherein the computing nodes are configured to communicate with one another via a network;

in response to receiving a request to access a given input value, select a given one of said index nodes of said index data structure and compare a tag value associated with said given index node with said given input value to determine whether said tag value is a prefix of said given input value;

in response to determining that said tag value is a prefix of said given input value, determine whether a corresponding tag value of any descendant of said given index node exactly matches or is a prefix of said given input value; and in response to determining that a corresponding tag value of a given descendant of said given index node exactly matches or is a proper prefix of said given input value, select said given descendant for further traversal.

28. The storage medium as recited in claim 27, wherein the instructions are further executable to replicate said index data structure among said plurality of computing nodes.

29. The storage medium as recited in claim 27, wherein the instructions are further executable to:
in response to receiving said request to access a given input value, determine whether said tag value exactly matches said given input value.

30. The storage medium as recited in claim 29, wherein the instructions are further executable to:
in response to determining that said tag value exactly matches said given input value, determine whether said given index node is an interior or a non-interior node; and
in response to determining that said given index node is an interior node, return a response to said request indicating that no data item corresponding to said given input value exists within said index data structure.

31. The storage medium as recited in claim 30, wherein the instructions are further executable to:
in response to determining that said given index node is a non-interior node, determine whether said given index node corresponds to a root node of a given one of said index tree data structures; and
in response to determining that said given index node corresponds to a root node of a given one of said index tree data structures, traverse said given index tree data structure beginning from said root node.

32. The storage medium as recited in claim 31, wherein the instructions are further executable to:
in response to determining that said given index node does not correspond to a root node of a given one of said index tree data structures, return an indication of a particular one of said data items associated with said given index node as a response to said request.

33. The storage medium as recited in claim 27, wherein the instructions are further executable to:
in response to determining that no corresponding tag value of any descendant of said given index node exactly matches or is a proper prefix of said given input value, return a response to said request indicating that no data item corresponding to said given input value exists within said index data structure.

34. The storage medium as recited in claim 29, wherein the instructions are further executable to:
in response to determining that said tag value of said given index node neither exactly matches nor is a prefix of said given input value, return a response to said request indicating that no data item corresponding to said given input value exists within said index data structure.

35. A method, comprising:
one or more computer systems implementing:
a given one of a plurality of index data structures selecting a random one of said plurality of index data structures instances at regular or irregular intervals, wherein each of said plurality of index data structures is configured to map ones of a plurality of input values to one or more corresponding data items, and wherein each of said plurality of index data structures includes a respective plurality of hierarchically-arranged index nodes; and
said given index data structure and said randomly-selected index data structure at least partially synchronizing said respective pluralities of index nodes according to an anti-entropy synchronization protocol;
in response to receiving a request to access a given input value, selecting a given one of said index nodes of said given index data structure and comparing a tag value associated with said given index node with said given input value to determine whether said tag value is a prefix of said given input value;
in response to determining that said tag value is a prefix of said given input value, determining whether a corresponding tag value of any descendant of said given index node exactly matches or is a prefix of said given input value; and
in response to determining that a corresponding tag value of a given descendant of said given index node exactly matches or is a proper prefix of said given input value, selecting said given descendant for further traversal;
wherein each of said index data structures is configured as an unbalanced data structure and is further configured such that for each particular index node within said each index data structure, membership of the particular index node within a particular hierarchical subgroup of said each index data structure is dependent upon the tag value associated with the particular index node and is independent of a number of index nodes within the particular hierarchical subgroup;

wherein for each of respective pluralities of index nodes, each index node has an associated tag value, wherein each of said data items corresponds to a respective one of said index nodes, and wherein for each given one of the index nodes for which there exists a corresponding given one of said data items, each tag value associated with each ancestor of said given corresponding index node is a prefix of the input value that maps to said given data item;

wherein for each given one of said index data structures, each of said plurality of index nodes included within said given index data structure is associated with a respective fingerprint value, wherein for a given one of said index nodes, said respective fingerprint value is indicative of a hash value computed according to a hash algorithm, wherein said hash value is computed as a function of ones of said plurality of index nodes that are hierarchical descendants of said given index node; and wherein each given one of said index data structures is stratified among a plurality of index tree data structures, wherein a root node of said given index data structure corresponds to a root node of a first one of said plurality of index tree data structures, wherein each of a plurality of leaf nodes of said first index tree data structure corresponds to a root node of a respective one of said index tree data structures, and wherein at least two of said plurality of index tree data structures are stored on different ones of a plurality of computing nodes, each of said computing nodes comprising at least one computer system having at least a processor, and wherein the computing nodes are configured to communicate with one another via a network.

36. The method as recited in claim 35, wherein for a given index node of said given index data structure, said synchronizing comprises said given index data structure sending a fingerprint message to said randomly-selected index data structure including said associated tag value and said respective fingerprint value corresponding to said given index node of said given index data structure.

37. The method as recited in claim 36, further comprising:
in response to receiving said fingerprint message, said randomly-selected index data structure determining whether said tag value included in said fingerprint message matches any particular index node included in said randomly-selected index data structure; and
in response to determining that said tag value does not match any particular index node, said randomly-selected index data structure sending a message to said given index data structure requesting data associated with said tag value.

38. The method as recited in claim 37, further comprising:
in response to determining that said tag value does match a particular index node, said randomly-selected index data structure determining whether said respective fingerprint value associated with said particular index node matches said respective fingerprint value corresponding to said given index node of said given index data structure.

39. The method as recited in claim 38, further comprising:
in response to determining that respective fingerprint values associated with said particular index node and said given index node do not match, said randomly-selected index data structure sending to said given index data structure a respective fingerprint message for each child node of said particular index node, wherein for each given child node of said particular index node, said respective fingerprint message includes said associated tag value and said respective fingerprint value corresponding to said given child node.

40. The method as recited in claim 38, further comprising:
in response to determining that respective fingerprint values associated with said particular index node and said given index node do not match, said randomly-selected index data structure encoding each descendant of said particular index node into a Bloom filter and sending to said given index data structure a filter message including said Bloom filter.

41. A tangible, computer-accessible storage medium comprising instructions, wherein the instructions are executable to implement:
a given one of a plurality of index data structures selecting a random one of said plurality of index data structures instances at regular or irregular intervals, wherein each of said plurality of index data structures is configured to map ones of a plurality of input values to one or more corresponding data items, and wherein each of said plurality of index data structures includes a respective plurality of hierarchically-arranged index nodes; and
said given index data structure and said randomly-selected index data structure at least partially synchronizing said respective pluralities of index nodes according to an anti-entropy synchronization protocol;
in response to receiving a request to access a given input value, selecting a given one of said index nodes of said given index data structure and comparing a tag value associated with said given index node with said given input value to determine whether said tag value is a prefix of said given input value;
in response to determining that said tag value is a prefix of said given input value, determining whether a corresponding tag value of any descendant of said given index node exactly matches or is a prefix of said given input value; and
in response to determining that a corresponding tag value of a given descendant of said given index node exactly matches or is a proper prefix of said given input value, selecting said given descendant for further traversal;
wherein each of said index data structures is configured as an unbalanced data structure and is further configured such that for each particular index node within said each index data structure, membership of the particular index node within a particular hierarchical subgroup of said each index data structure is dependent upon the tag value associated with the particular index node and is independent of a number of index nodes within the particular hierarchical subgroup;
wherein for each of respective pluralities of index nodes, each index node has an associated tag value, wherein each of said data items corresponds to a respective one of said index nodes, and wherein for each given one of the index nodes for which there exists a corresponding given one of said data items, each tag value associated with each ancestor of said given corresponding index node is a prefix of the input value that maps to said given data item;
wherein for each given one of said index data structures, each of said plurality of index nodes included within said given index data structure is associated with a respective fingerprint value, wherein for a given one of said index nodes, said respective fingerprint value is indicative of a hash value computed according to a hash algorithm, wherein said hash value is computed as a function of ones of said plurality of index nodes that are hierarchical descendants of said given index node; and wherein each given one of said index data structures is stratified among a plurality of index tree data structures, wherein a root node of said given index data structure corresponds to a root node of a first one of said plurality of index tree data structures, wherein each of a plurality of leaf nodes of said first index tree data structure corresponds to a root node of a respective one of said index tree data structures, and wherein at least two of said plurality of index tree data structures are stored on different ones of a plurality of computing nodes, each of said computing nodes comprising at least one computer system having at least a processor, and wherein the computing nodes are configured to communicate with one another via a network.

42. The storage medium as recited in claim 41, wherein to implement said synchronizing for a given index node of said given index data structure, the instructions are further executable to implement said given index data structure sending a fingerprint message to said randomly-selected index data structure including said associated tag value and said respective fingerprint value corresponding to said given index node of said given index data structure.

43. The storage medium as recited in claim 42, wherein the instructions are further executable to implement:

in response to receiving said fingerprint message, said randomly-selected index data structure determining whether said tag value included in said fingerprint message matches any particular index node included in said randomly-selected index data structure; and in response to determining that said tag value does not match any particular index node, said randomly-selected index data structure sending a message to said given index data structure requesting data associated with said tag value.

44. The storage medium as recited in claim 43, wherein the instructions are further executable to implement:

in response to determining that said tag value does match a particular index node, said randomly-selected index data structure determining whether said respective fingerprint value associated with said particular index node matches said respective fingerprint value corresponding to said given index node of said given index data structure.

45. The storage medium as recited in claim 44, wherein the instructions are further executable to implement:

in response to determining that respective fingerprint values associated with said particular index node and said given index node do not match, said randomly-selected index data structure sending to said given index data structure a respective fingerprint message for each child node of said particular index node, wherein for each given child node of said particular index node, said respective fingerprint message includes said associated tag value and said respective fingerprint value corresponding to said given child node.

46. The storage medium as recited in claim 44, wherein the instructions are further executable to implement:

in response to determining that respective fingerprint values associated with said particular index node and said given index node do not match, said randomly-selected index data structure encoding each descendant of said particular index node into a Bloom filter and sending to said given index data structure a filter message including said Bloom filter.

* * * * *